United States Patent
Kimener et al.

(10) Patent No.: US 8,056,174 B2
(45) Date of Patent: Nov. 15, 2011

(54) REPOSITIONABLE PIT SEAL

(75) Inventors: R. Peter Kimener, Loveland, OH (US);
Thomas Terrance Kimener, Loveland, OH (US); Kenneth A. Frank, Cincinnati, OH (US)

(73) Assignee: Midwest Industrial Door, Inc., Loveland, OH (US)

( * ) Notice: Subject to any disclaimer, the term of this patent is extended or adjusted under 35 U.S.C. 154(b) by 187 days.

(21) Appl. No.: 12/686,465

(22) Filed: Jan. 13, 2010

(65) Prior Publication Data

US 2011/0061185 A1    Mar. 17, 2011

Related U.S. Application Data

(60) Provisional application No. 61/242,112, filed on Sep. 14, 2009.

(51) Int. Cl.
*E01D 1/00*    (2006.01)
*B65G 69/32*    (2006.01)

(52) U.S. Cl. .......................... 14/71.1; 14/69.5

(58) Field of Classification Search ........... 14/69.5–71.7
See application file for complete search history.

(56) References Cited

U.S. PATENT DOCUMENTS

| | | | |
|---|---|---|---|
| 3,992,835 A | 11/1976 | Saveker |
| 4,294,055 A | 10/1981 | Andresen |
| 4,356,668 A | 11/1982 | Wagner |
| 4,392,769 A | 7/1983 | Lowery |
| 4,397,115 A | 8/1983 | Crawford |
| 4,490,068 A | 12/1984 | Dickinson |
| 4,536,990 A | 8/1985 | Siegrist et al. |
| 4,576,508 A | 3/1986 | Dickinson |
| 4,576,509 A | 3/1986 | Beaty, Sr. |
| 4,620,743 A | 11/1986 | Eke |
| 4,624,600 A | 11/1986 | Wagner et al. |
| 4,627,763 A | 12/1986 | Roemer et al. |
| 4,643,239 A | 2/1987 | Wentzel |
| 4,682,382 A | 7/1987 | Bennett |
| 4,765,093 A | 8/1988 | Edwards, Jr. |
| 4,775,261 A | 10/1988 | Fladung |
| 4,800,618 A | 1/1989 | Putz |
| 4,850,737 A | 7/1989 | Nasatka et al. |
| 4,861,185 A | 8/1989 | Eikelenboon |
| 5,027,552 A | 7/1991 | Miller et al. |
| 5,088,143 A | 2/1992 | Alexander |
| 5,146,713 A | 9/1992 | Grafius |
| 5,152,370 A | 10/1992 | Silberman |
| 5,291,686 A | 3/1994 | Sears et al. |
| 5,327,680 A | 7/1994 | Miller |
| 5,337,520 A | 8/1994 | Uribe |
| 5,375,283 A | 12/1994 | Silberman |
| 5,381,575 A | 1/1995 | Silberman |
| 5,396,676 A | 3/1995 | Alexander et al. |
| 5,440,772 A | 8/1995 | Springer et al. |
| 5,450,643 A | 9/1995 | Warner |
| 5,452,489 A | 9/1995 | Gelder et al. |
| 5,457,838 A | 10/1995 | Gelder et al. |

(Continued)

*Primary Examiner* — Raymond Addie
(74) *Attorney, Agent, or Firm* — Taft Stettinius & Hollister LLP

(57) ABSTRACT

A method of selectively closing off a loading dock opening defined by a loading dock pit recessed within a floor of a building and a doorway into the building, the method comprising: (a) repositioning a pit seal panel having a substantially incompressible height and width to a barrier position where the pit seal panel closes off a rectangular area substantially spanning an entire vertical dimension and an entire widthwise dimension of the loading dock pit; and (b) lowering an overhead door to concurrently contact the pit seal panel and the floor of the building to close off the loading dock opening.

20 Claims, 26 Drawing Sheets

U.S. PATENT DOCUMENTS

| | | |
|---|---|---|
| 5,475,948 A | 12/1995 | Parke |
| 5,577,544 A | 11/1996 | Carper et al. |
| 5,586,355 A | 12/1996 | Metz et al. |
| 5,621,938 A | 4/1997 | Warner |
| 5,659,926 A | 8/1997 | Dietrich |
| 5,762,443 A | 6/1998 | Gelfand et al. |
| 5,794,537 A | 8/1998 | Zaerr et al. |
| 5,831,540 A | 11/1998 | Sullivan et al. |
| 5,950,364 A | 9/1999 | Hormann |
| 6,061,859 A | 5/2000 | Winter |
| 6,081,954 A | 7/2000 | Palmersheim et al. |
| 6,098,227 A | 8/2000 | Meichtry et al. |
| 6,112,353 A | 9/2000 | Winter |
| 6,125,491 A | 10/2000 | Alexander |
| 6,148,896 A | 11/2000 | Pinto et al. |
| 6,164,014 A | 12/2000 | McDowell et al. |
| 6,176,044 B1 | 1/2001 | Nixon et al. |
| 6,240,587 B1 | 6/2001 | Meichtry et al. |
| 6,276,016 B1 | 8/2001 | Springer |
| 6,349,441 B1 | 2/2002 | Kosuch |
| 6,360,393 B1 | 3/2002 | Fritz |
| 6,405,397 B1 | 6/2002 | Alexander |
| 6,431,815 B1 | 8/2002 | Zarzecki et al. |
| 6,434,886 B1 | 8/2002 | Johnson et al. |
| 6,442,783 B1 | 9/2002 | Yoon et al. |
| 6,460,212 B2 | 10/2002 | Massey et al. |
| 6,473,926 B2 | 11/2002 | Lounsbury |
| 6,481,038 B2 | 11/2002 | Lounsbury et al. |
| 6,499,169 B2 | 12/2002 | Hahn et al. |
| 6,502,268 B2 | 1/2003 | Ashelin et al. |
| 6,594,842 B2 | 7/2003 | Alexander |
| 6,629,328 B2 | 10/2003 | Widule |
| 6,640,496 B2 | 11/2003 | Mullet |
| 6,715,236 B2 | 4/2004 | Mullet |
| 6,781,516 B2 | 8/2004 | Reynard et al. |
| 6,813,792 B2 | 11/2004 | Miller |
| 6,832,403 B2 | 12/2004 | Hahn et al. |
| 6,840,300 B2 | 1/2005 | Lewis, Jr. |
| 6,892,411 B1 | 5/2005 | Yoon et al. |
| 6,928,696 B2 | 8/2005 | Wartman |
| 7,010,825 B1 | 3/2006 | Finch Salas et al. |
| 7,114,291 B2 | 10/2006 | David |
| 7,146,673 B1 | 12/2006 | Digmann et al. |
| 7,178,289 B2 | 2/2007 | Gierl et al. |
| 7,192,240 B2 | 3/2007 | Aulicino |
| 7,195,301 B2 | 3/2007 | Aulicino |
| 7,213,285 B2 | 5/2007 | Mitchell |
| 7,278,242 B2 | 10/2007 | Sanders |
| 7,297,390 B2 | 11/2007 | Simmons et al. |
| 7,367,160 B2 | 5/2008 | Mullet et al. |
| 7,503,089 B2 | 3/2009 | Muhl et al. |
| 7,594,290 B2 | 9/2009 | Eungard et al. |
| 2002/0069585 A1 | 6/2002 | Schiks |
| 2002/0162179 A1 | 11/2002 | Hahn et al. |
| 2003/0188489 A1 | 10/2003 | Shoemaker |
| 2005/0044793 A1 | 3/2005 | Hormann |
| 2007/0101517 A1 | 5/2007 | Digmann et al. |
| 2008/0066241 A1 | 3/2008 | Evans |
| 2008/0083166 A1 | 4/2008 | Brown et al. |
| 2008/0168713 A1 | 7/2008 | Mogilevskiy |
| 2008/0229524 A1 | 9/2008 | Watchorn et al. |
| 2008/0236045 A1 | 10/2008 | DeBlonk et al. |
| 2009/0044453 A1 | 2/2009 | Meichtry |
| 2009/0044454 A1 | 2/2009 | Meichtry |
| 2009/0100763 A1 | 4/2009 | Leist et al. |
| 2009/0107047 A1 | 4/2009 | Magill et al. |
| 2009/0193716 A1 | 8/2009 | Magill et al. |
| 2009/0236053 A1 | 9/2009 | Kimener |
| 2009/0241422 A1 | 10/2009 | Mock et al. |
| 2010/0017976 A1 | 1/2010 | Metz et al. |
| 2010/0024308 A1 | 2/2010 | Coubray et al. |

REPOSITIONABLE PIT SEAL

CROSS REFERENCE TO RELATED APPLICATIONS

The present application claims the benefit of U.S. Provisional Patent Application Ser. No. 61/242,112, entitled, "REPOSITIONABLE PIT SEAL," filed Sep. 14, 2009.

RELATED ART

1. Field of the Invention

The present invention is directed to a novel art, repositionable pit seals for shipping dock pits originally designed to accommodate horizontally stored dock levelers, but retrofitted to accommodate vertically stored dock levelers.

2. Brief Discussion of Related Art

Referring to FIG. 1, Vertical Storing Dock Levelers (VSDLs) 10 are commonly hydraulically operated dock levelers that provide a generally horizontal gangway between the floor 12 of a building and the floor of a transport vehicle (i.e., a truck or tractor trailer) in order to load and unload goods between the building and the transport vehicle. As the name indicates, VSDLs 10 are stored vertically, in contrast to the horizontal use position, and allow the recessed floor 14 of the building to which the VSDL is mounted to be accessible for clean-up purposes.

In circumstances where a building is designed to accommodate VSDLs 10, a two-tiered or stair-stepped building floor is poured. The first, upper tier floor 12 is the primary floor of the building and is generally level across the vast majority of the building. But the second tier floor or bottom floor 14 is vertically lower than the upper tier floor by approximately 10-12 inches. This second tier floor 14 is substantially level and commonly extends across the entire side of the building where one or more loading docks are located. The opening of each loading dock may be closed off exclusively by an overhead door.

Consistent with the foregoing reference system, C-channel track for the overhead door (not shown) may extend to the surface of the second tier floor 14. The overhead door vertically and horizontally spans the entire loading dock opening when in a lowered position. This lowered position corresponds to the bottom of the overhead door abutting the top surface of the second tier floor 14 to substantially prevent air loss gaps and access for vermin entry. In other words, the overhead door extends vertically below the horizontal surface of the first tier floor 12.

Referencing FIG. 2, in circumstances where a building is designed to accommodate horizontally stored dock levelers 22, individual rectangular pits 16 are formed into the concrete floor to accommodate each dock leveler. The walls of the pit 16 partially define a cubic rectangular cavity and include a right side wall 18, a left side wall 20, a rear wall, and a floor 24. In some cases, the pit walls 18, 20, 24 are lined with a metal insert. Nevertheless, horizontally stored dock levelers 22 are repositionable to change the pitch of the gangway or dock floor to accommodate loading heights higher and lower than the building floor.

Conventional horizontally stored dock levelers 22 include a top surface or deck that is generally level with that of the building floor surrounding the pit 16 when the dock leveler is not in use. As a result of this horizontal storage position, conventional overhead doors contact the gangway of the dock leveler 22 so that both the overhead door and dock leveler block the opening of the dock. In other words, the overhead doors do not close off the portion of the loading dock opening partially occupied by the dock leveler. This also means that the C-channel guides for the overhead doors only extend to the building floor, which is elevated with respect to the pit floor. Thus, any gap between the top of the dock leveler (gangway) and the pit floor cannot be closed off by an overhead door. Because gaps between the dock leveler 22 and pit 16 cannot be sealed by the overhead door, these gaps allow airflow therethrough, as well as access for vermin. Because of these problems, many buildings designed to use horizontally stored dock levelers 22 have been retrofit to accommodate VSDLs 10. But this retrofitting comes at a considerable price.

Retrofitting costs to convert a building previously using horizontally stored dock levelers 22 to VSDLs 10 are substantial. First, the vertical storage orientation of the VSDLs 10 requires the overhead door to close off the entire dock opening. In order to accommodate an overhead door that goes beyond the primary building floor and extends into the pit 16, concrete must be removed on both sides of the pit below the location of the old C-channel overhead door guides. Thereafter, new C-channel is installed that extends into the floor of the expanded pit 16. In addition, at least one new section must be added to the overhead door to provide the increased vertical length necessary to close off the opening. Alternatively, an entirely new overhead door may be installed. Not only are the direct costs associated with retrofitting expensive, but so too are the indirect costs associated with losing access to a loading dock until the retrofitting is complete.

INTRODUCTION TO THE INVENTION

The instant disclosure provides an alternative to conventional retrofitting of buildings to accommodate VSDLs 10. In particular the instant disclosure provides a more cost effective alternative by substantially lessening expenses and down time to switch a loading dock from the horizontally stored dock leveler 22 to a VSDL 10. Of particular importance, the instant disclosure allows building owners to maintain their existing overhead doors, track, and floor. Instead of cutting out portions of the building floor to bring the overhead door to the floor, as is the case in the prior art, the instant disclosure is operative to bring the floor to the door or bring the door to the floor without changing the dimensions of the floor. Specifically, the vertical depth and width at the front of a conventional pit is closed off using a repositionable pit seal. This repositionable pit seal may be mounted to the pit floor or to the overhead door in order to close off the vertical depth and width of the pit when the VSDL 10 is in its vertical storage position. However, when the VSDL 10 is in its horizontal use position, the repositionable pit seal is moved out of the way of the VSDL. The repositionable pit seal may be automatically or manually repositioned by the actuation of the overhead door, the actuation of the VSDL 10, or an independent device. The repositionable pit seal is operative to reduce drafts through the front opening of the pit and allows buildings having dock leveler pits to be retrofit without expanding the pit or replacing the preexisting overhead door.

It is a first aspect of the present invention to provide a method of selectively closing off a loading dock opening defined by a loading dock pit recessed within a floor of a building and a doorway into the building, the method comprising: (a) repositioning a pit seal panel having a substantially incompressible height and width to a barrier position where the pit seal panel closes off a rectangular area substantially spanning an entire vertical dimension and an entire widthwise dimension of the loading dock pit; and (b) lowering an overhead door to concurrently contact the pit seal panel and the floor of the building to close off the loading dock opening.

In a more detailed embodiment of the first aspect, the method further includes repositioning a vertically stored dock leveler from a horizontal use position to a vertical storage position prior, the vertically stored dock leveler at least partially located within the loading dock pit, wherein repositioning the vertically stored dock leveler from the horizontal use position to the vertical storage position coincides with repositioning the pit seal panel to the barrier position. In yet another more detailed embodiment, a mechanical linkage is concurrently mounted to the vertical stored dock leveler and the pit seal panel so that repositioning the vertically stored dock leveler to from the horizontal use position to the vertical storage position is operative to reposition the pit seal panel to the barrier position. In a further detailed embodiment, the act of repositioning the pit seal panel includes controlling the repositioning of the pit seal panel with an electronic controller that receives information regarding the position of the vertically stored dock leveler. In still a further detailed embodiment, the pit seal panel is mounted to an interior wall partially defining the loading dock pit, and the act of repositioning the pit seal panel to the barrier position includes pivoting the pit seal panel with respect to the interior wall of the loading dock pit.

In yet another more detailed embodiment of the first aspect, the pit seal panel is mounted to the overhead door, and the act of repositioning the pit seal panel to the barrier position includes repositioning the pit seal panel with respect to the overhead door and lowering the pit seal panel into the loading dock pit. In still another more detailed embodiment, the pit seal panel is pivotally mounted to the overhead door, and an actuator is concurrently mounted to the pit seal panel and the overhead door to reposition the pit seal panel to the barrier position. In a further detailed embodiment, a top of the pit seal panel engages a bottom of the overhead door when the bottom of the overhead door contacts the top of the pit seal panel to lock the pit seal panel to the overhead door. In still a further detailed embodiment, the method further includes repositioning the pit seal panel from the barrier position to a storage position, and raising an overhead door to discontinue contact with the floor of the building, where raising the overhead door and repositioning the pit seal panel to the storage position is operative to no longer close off the loading dock opening. In a more detailed embodiment, further comprising the act of lowering the overhead door to concurrently contact the pit seal panel and the floor of the building is operative to lock the pit seal panel in the barrier position.

It is a second aspect of the present invention to provide a method of repositioning a rigid wall to selectively blockade a forward area of a loading dock pit formed into the floor of a building and partially defined by opposing vertical side walls, a rear vertical wall, and a bottom horizontal surface, the loading dock pit including a rear area, opposite the forward aspect, at least partially occupied by a vertically stored dock leveler, the method comprising: (a) positioning a rigid wall to a blocking position within the forward aspect of the loading dock pit, the blocking position having the rigid wall horizontally spanning between the opposing vertical side walls and concurrently vertically spanning between the bottom horizontal surface and a horizontal plane of the floor of the building; and (b) positioning an overhead door to concurrently contact the rigid wall and the floor of the building to lock the rigid wall in the blocking position.

In a more detailed embodiment of the second aspect, the method further comprises repositioning the rigid wall from the blocking position to a storage position so the rigid wall does not concurrently horizontally span between the opposing vertical side walls and vertically span between the bottom horizontal surface and the horizontal plane of the floor of the building, and repositioning the overhead door to no longer concurrently contact the rigid wall and the floor of the building, and positioning the vertically stored dock leveler from a vertical storage position to a horizontal use position so that a decking of the vertically stored dock leveler is generally parallel to the floor of the building, where the vertical storage position is not reached prior to repositioning the rigid wall from the blocking position. In yet another more detailed embodiment, the method further comprising the act of positioning the vertically stored dock leveler to a vertical storage position so that a decking of the vertically stored dock leveler is generally perpendicular to the floor of the building, wherein a mechanical linkage is concurrently mounted to the vertical stored dock leveler and the rigid wall so that positioning the vertically stored dock leveler to the vertical storage position is operative to position the rigid wall to the blocking position. In a further detailed embodiment, the act of repositioning the rigid wall from the blocking position to the storage position includes controlling the repositioning of the rigid wall with an electronic controller that receives information regarding the position of the vertically stored dock leveler.

In yet another more detailed embodiment of the second aspect, the rigid wall is mounted to at least one of the opposing vertical side walls and the bottom horizontal surface partially defining the loading dock pit, and the act of positioning the rigid wall to the blocking position includes pivoting the rigid wall with respect to at least one of the opposing vertical side walls and the bottom horizontal surface of the loading dock pit. In still another more detailed embodiment, the method further comprises positioning the vertically stored dock leveler from a vertical storage position to a horizontal use position so that a decking of the vertically stored dock leveler is generally parallel to the floor of the building, and the act of pivoting the rigid wall with respect to at least one of the opposing vertical side walls of the loading dock pit includes pivoting the rigid wall to be beneath the vertically stored dock leveler when the vertically stored dock leveler is in the horizontal use position. In a further detailed embodiment, the method further comprises repositioning the rigid wall from the blocking position to a storage position by lifting the rigid wall out of the loading dock pit, wherein the rigid wall is removably mounted to at least one of the opposing vertical side walls and the bottom horizontal surface partially defining the loading dock pit. In still a further detailed embodiment, the rigid wall is mounted to the overhead door, and the act of positioning the rigid wall to the blocking position includes positioning the rigid wall with respect to the overhead door and lowering the rigid wall into the forward aspect of the loading dock pit. In a more detailed embodiment, a top of the rigid wall locks into a bottom of the overhead door when the bottom of the overhead door contacts the top of the rigid barrier. In a more detailed embodiment, the method further comprises repositioning the vertically stored dock leveler from a vertical storage position to a horizontal use position, repositioning the rigid wall from a blocking position to a storage position beneath the horizontal use position of the vertically stored dock leveler, and where the rigid wall is biased to the blocking position, and where the act of repositioning the vertically stored dock leveler from a vertical storage position to a horizontal use position includes the vertically stored dock leveler contacting a roller mounted to rigid wall to overcome the bias of the rigid wall and reposition the rigid wall to the storage position.

DETAILED DESCRIPTION

The exemplary embodiments of the present disclosure are described and illustrated below to encompass repositionable pit doors for dock leveler pits. Of course, it will be apparent to those of ordinary skill in the art that the embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Figure 1:
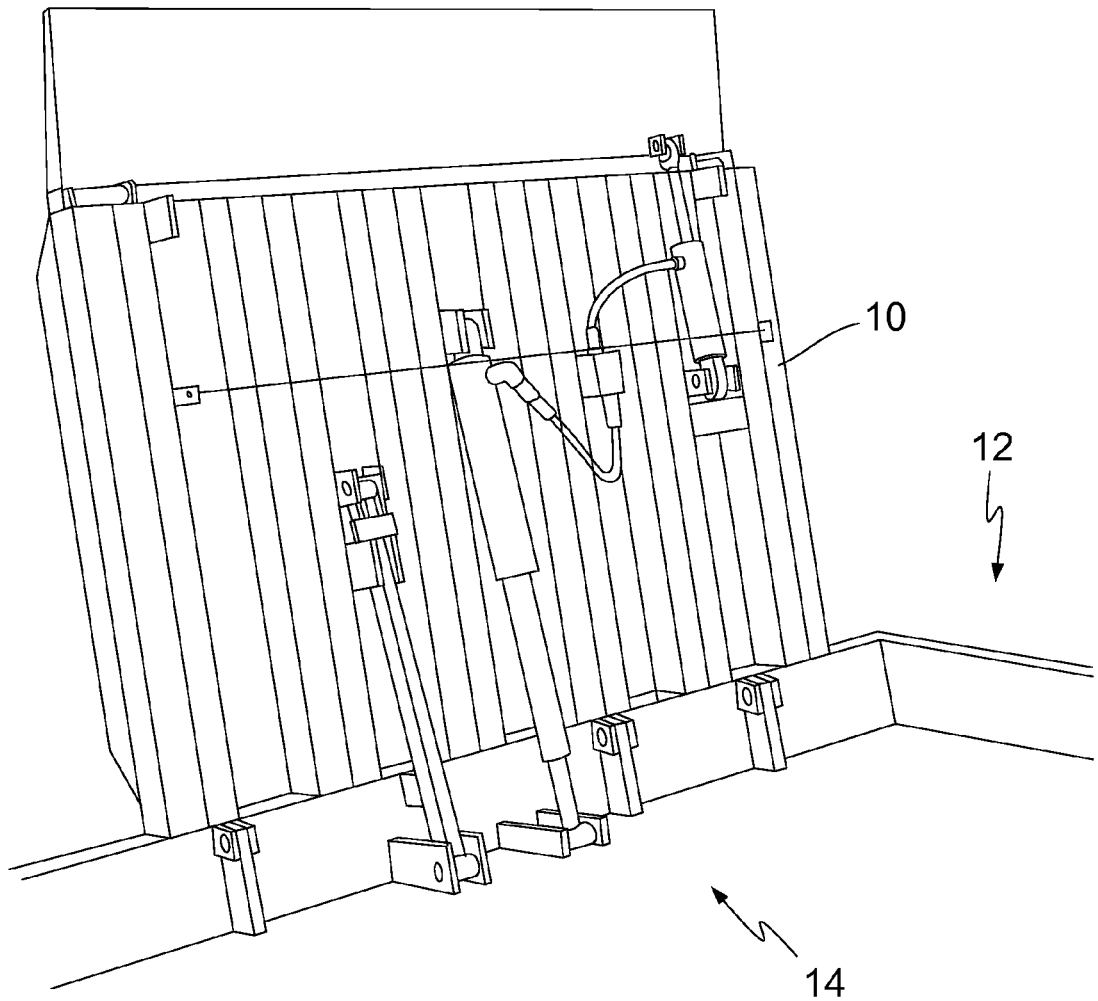
FIG. 1 is a perspective view of a vertical stored dock leveler, showing the underneath surface of the dock leveler.
Figure 2:
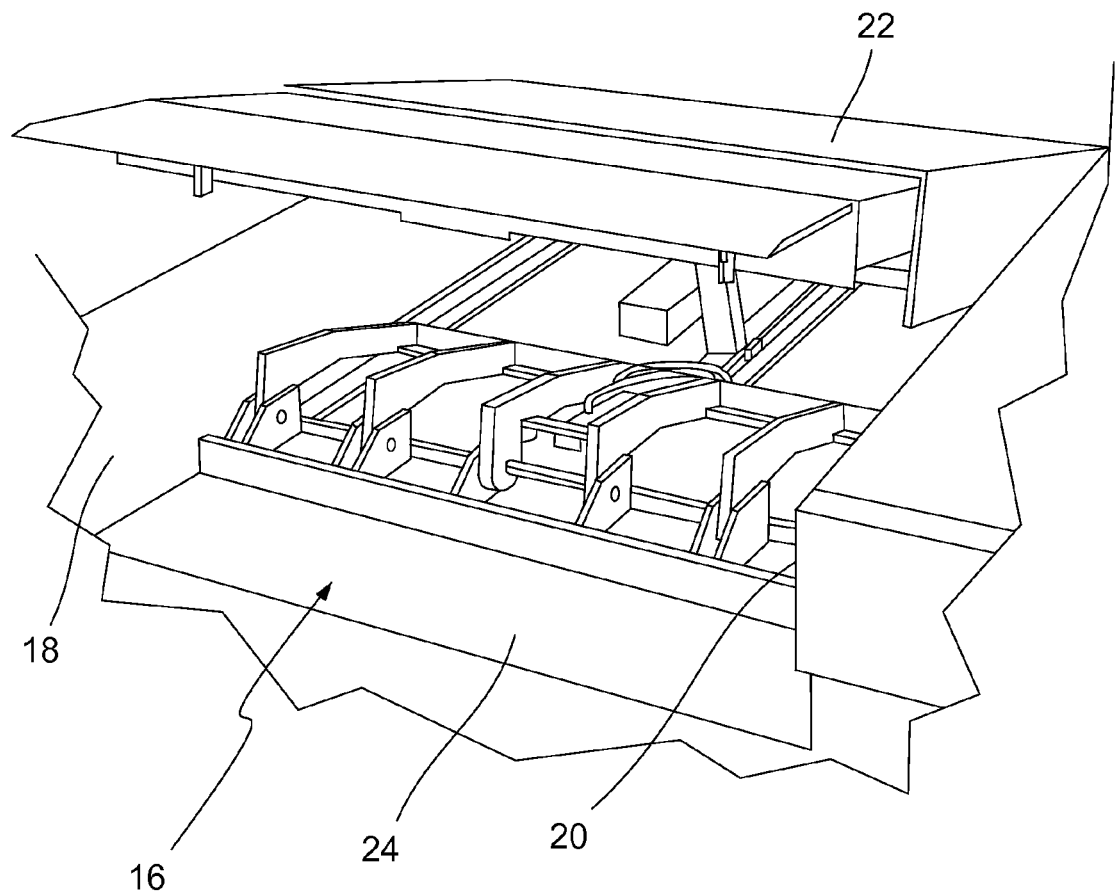
FIG. 2 is an elevated perspective view of a horizontally stored dock leveler, shown in its fully raised position.
Figure 3:
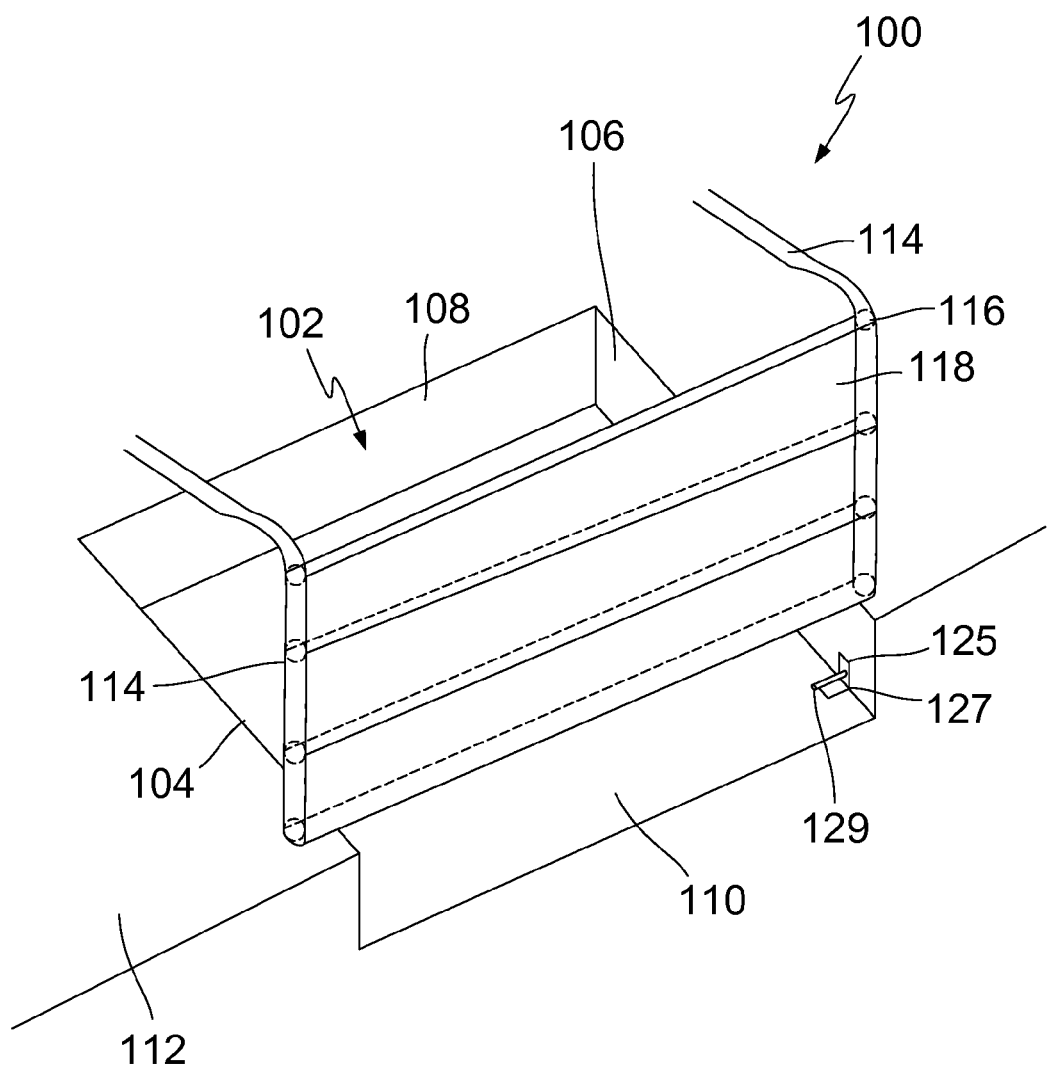
FIG. 3 is an elevated, isolated perspective view of a convention loading dock pit, with an overhead door in the closed position.
Figure 4:
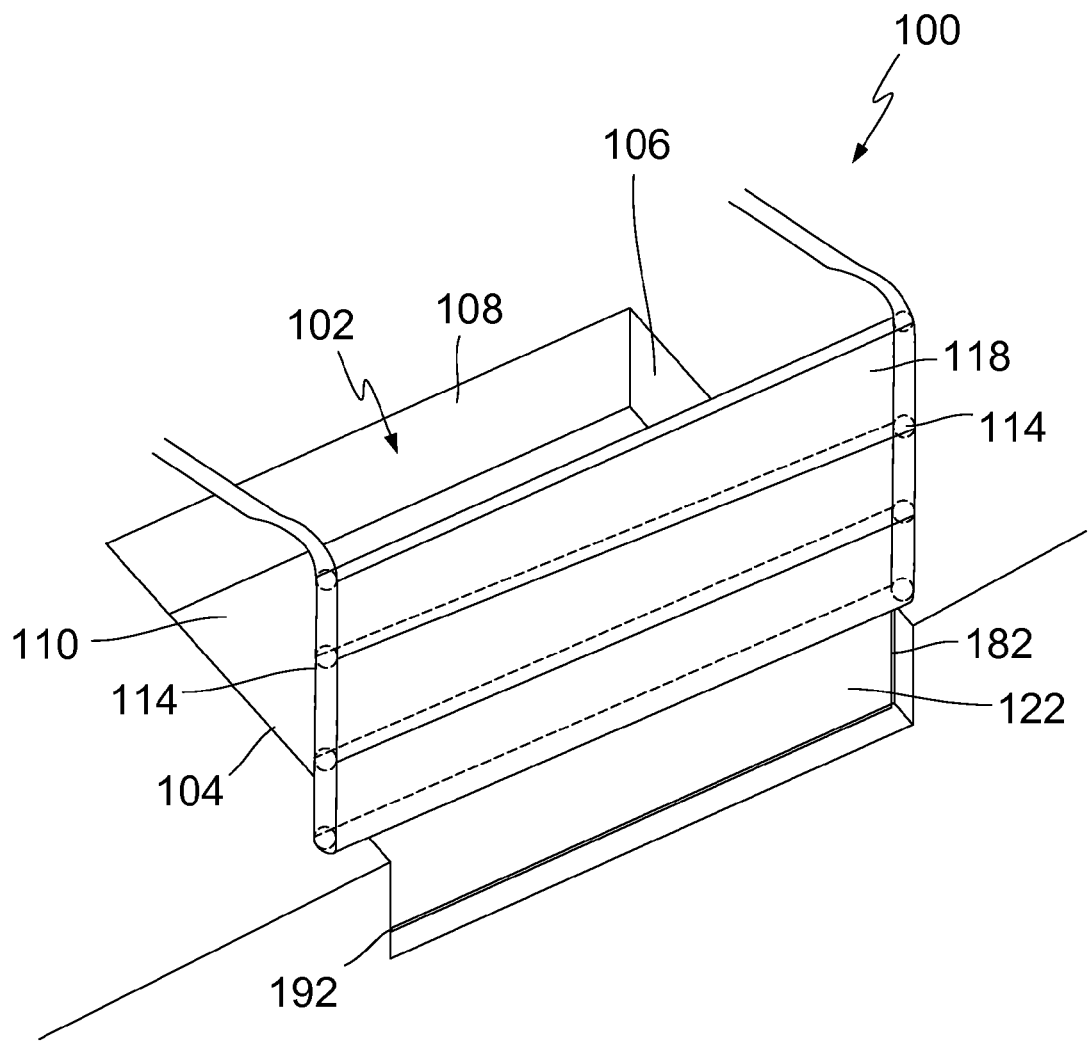
FIG. 4 is an elevated perspective view of an exemplary repositionable pit seal mounted within a conventional loading dock pit, where the pit seal is shown in its vertical deployed position and where the overhead door is shown in its closed position.

Referencing FIGS. 3 and 4, an exemplary loading dock 100 includes a pit 102 formed within a floor 112 of a warehouse or other loading/unloading facility that previously accommodated a horizontally stored dock leveler. The pit includes right 104, left 106, and rear 108 walls, in addition to a recessed (with respect to the warehouse floor 112) horizontal floor 110. The warehouse floor 112 adjacent the right and left walls 104, 106 has embedded therein a C-track 114 that receives rollers 116 (shown in phantom) mounted to an overhead door 118 (shown in phantom). In this exemplary embodiment, the overhead door 118 is retained in its native form just as it was with the conventional, horizontally stored dock leveler.

Figure 5:
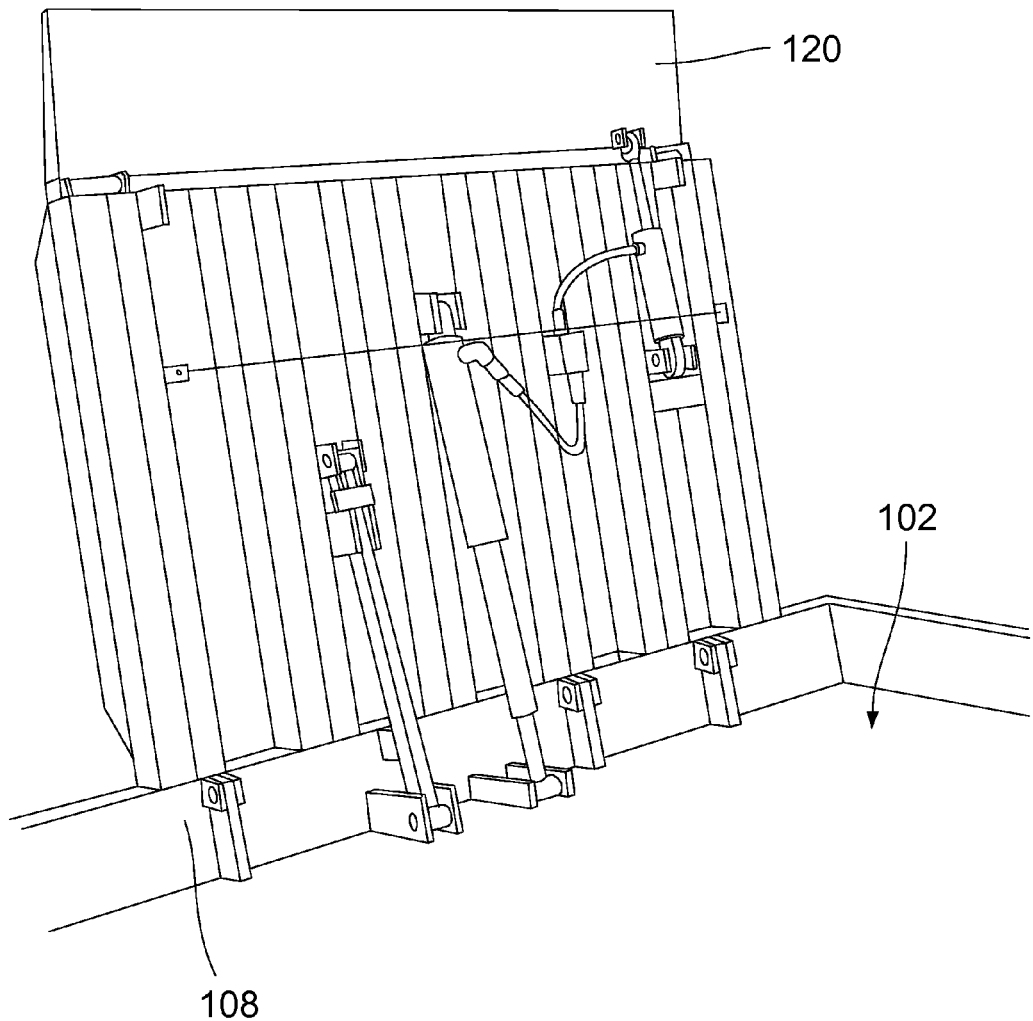
FIG. 5 a perspective view of a vertical stored dock leveler mounted within a conventional loading dock pit and stored in its vertical storage position.
Figure 6:
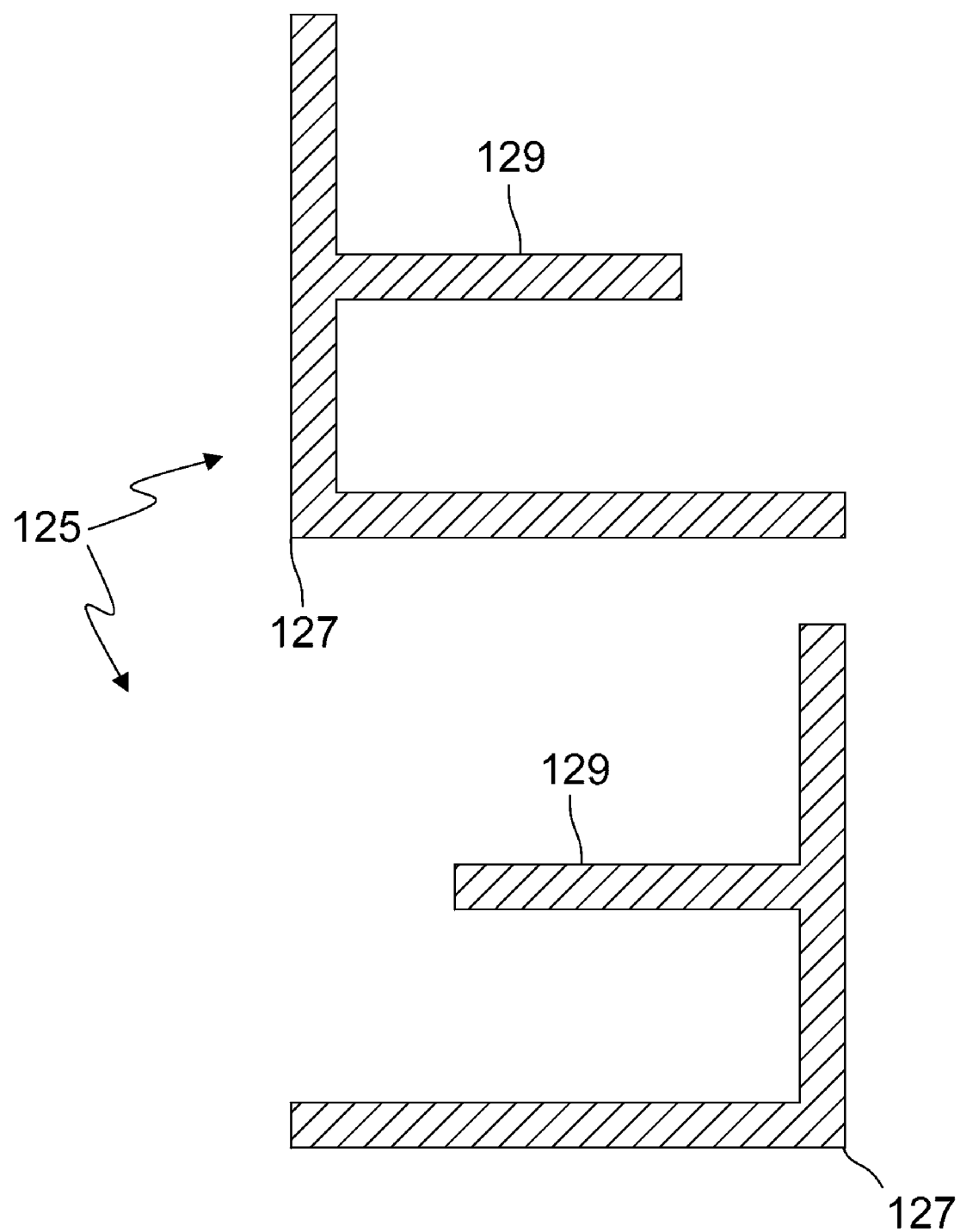
FIG. 6 are cross-sectional views of mounting brackets for use with an exemplary embodiment of the disclosure.

Referring to FIGS. 4 and 5, the retrofitting includes replacing a horizontally stored dock leveler with a vertical stored dock leveler (VSDL) 120 (not shown in FIG. 4), which is mounted to the pit 102 proximate the rear wall 108. Proximate the front of the pit 102, opposite the rear wall 108 is a repositionable pit door 122. This repositionable pit door 122 has vertical dimensions approximating the depth of the pit 102 and lateral dimensions approximating the width of the pit.

Referencing FIGS. 3, 4, 6 and 7, the base of the pit door 122 is pivotally mounted to the floor 110 of the pit 102. Two 90° angle brackets 125 are mounted to the right and left walls 104, 106 of the pit 102 so that the corner 127 of each bracket fits within a corresponding corner formed by the interface of the right/left wall 104, 106 with the pit floor 110. Each bracket 125 includes a dowel 129 that extends perpendicularly outward from the left/right wall 104, 106. The dowel 129 is seated within a key-shaped opening 134 that longitudinally extends across a lower portion of the extruded plastic pit seal panel 123. As will be discussed in more detail hereafter, the pit door 122 is removably mounted to the dowels 129 in order to allow removal of the pit door 122 when the VSDL 120 is vertically stored, so as to allow easier cleaning of the pit 102.

Figure 7:
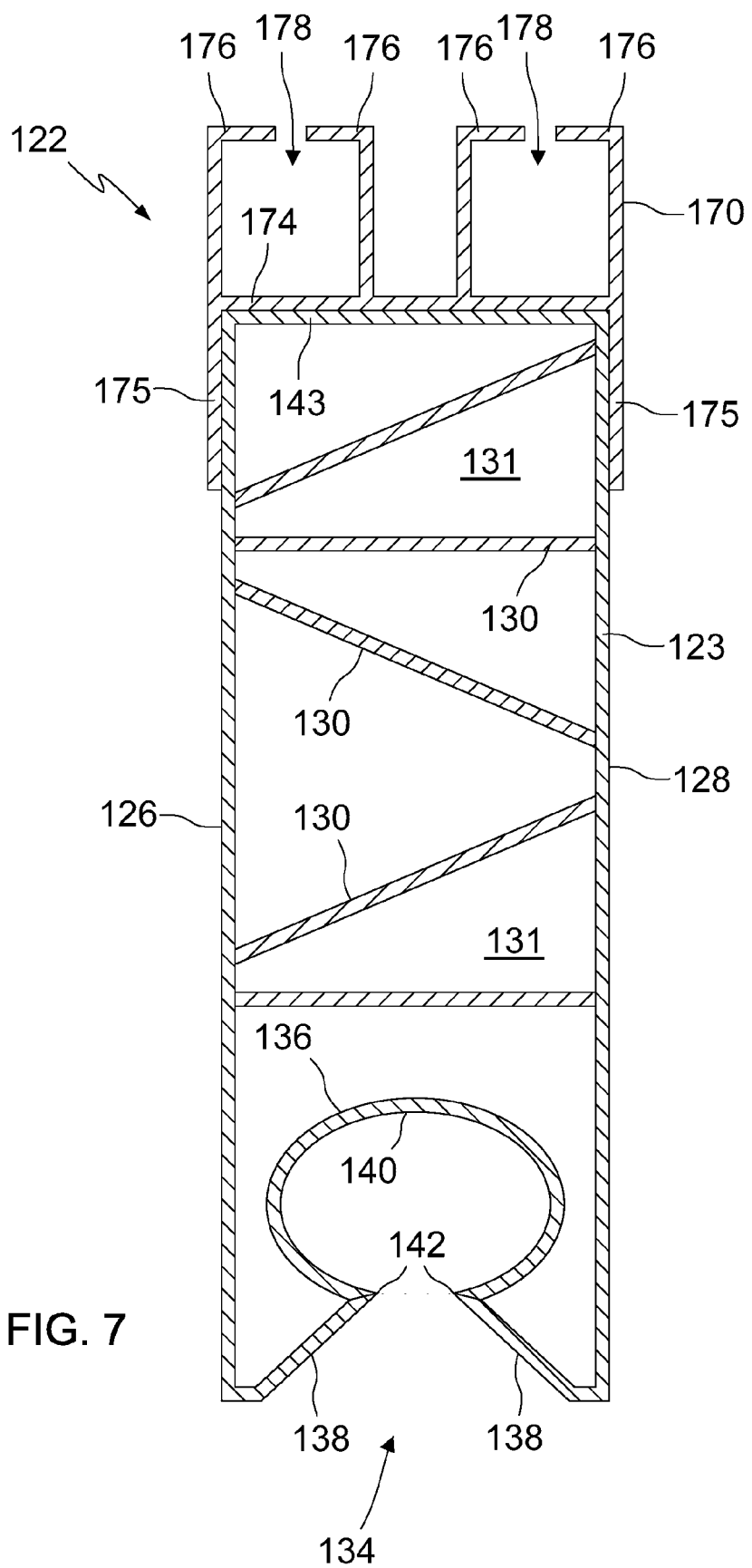
FIG. 7 is a cross-sectional view of an exemplary pit seal panel in accordance with an exemplary embodiment of the disclosure.

Referring to FIG. 7, the pit door 122 includes an extruded pit panel 123 having a generally planar front vertical wall 126 spaced apart from a generally planar rear vertical wall 128 by a plurality of linear, longitudinal ribs 130. Some of the longitudinal ribs 130 extend normally between the front and rear walls 126, 128, while other ribs 130 extend between the front and rear walls 126, 128 at obtuse or acute angles. The longitudinal ribs 130 are spaced apart from one another so that longitudinal voids 131 are formed that are generally bounded by adjacent ribs 130 and the front and rear vertical walls 126, 128. The longitudinal ribs 130 are operative to retard substantial deformation of the front and rear walls 126, 128 when horizontal contact forces are applied to the walls 126, 128. At the same time, the longitudinal ribs 130 are operative to function as a structural support for the front and rear walls 126, 128 so these walls 126, 128 are operative to support vertical loads. At the bottom of the panel 123, longitudinally extending in parallel to the longitudinal ribs 130, is a key-shaped opening 134. This key-shaped opening 134 defines a key-shaped rib 136 having opposed tapering surfaces 138 that intersect with a semi-circular surface 140. The semi-circular surface 140 defines a substantially cylindrical cavity into which the dowels 129 of the angle brackets 125 are received. A pair of detents 142 are formed at the intersection of the tapering surfaces 138 and the semi-circular surface 140 in order to allow the panel 123 to be selectively removed from the dowels 129 and thereafter allow the panel 123 to receive the dowels 129 and thereby selectively reattach the panel 123 to the dowels. Opposite the key-shaped rib 136 is a generally planar top surface 143, where the top surface 143 and the key-shaped rib 136 sandwich the longitudinal ribs 130 therebetween. In this exemplary embodiment, the lateral/longitudinal ends of the panel 123 remain open. In addition, it is also within the scope of the invention to at least partially fill some or all the voids 131 with insulation. Exemplary forms of insulation include, without limitation, polystyrene foams, polyethylene foams, and latex foams.

Figure 8:
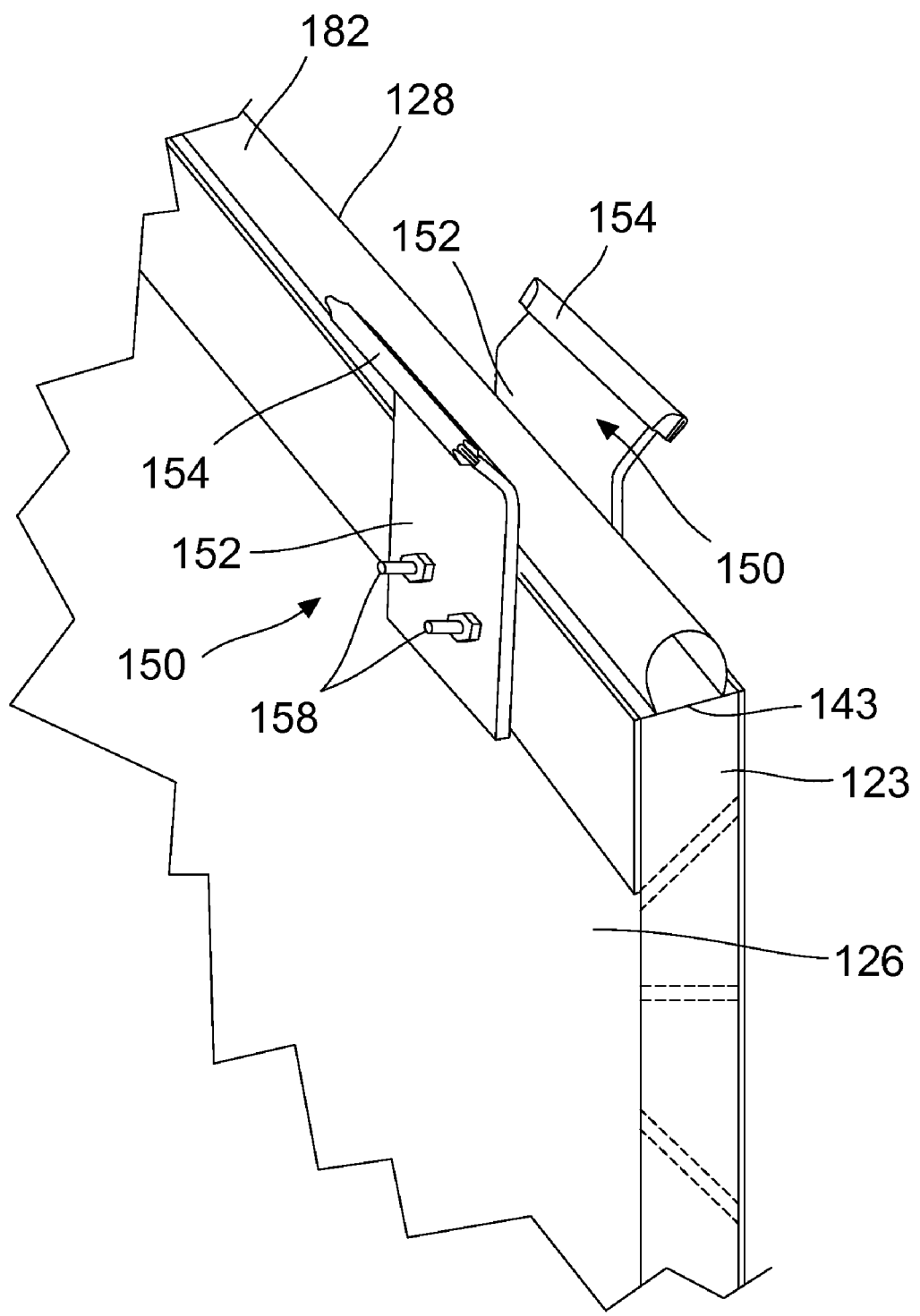
FIG. 8 is an isolated, perspective view of a top corner of a pit seal panel in accordance with an exemplary embodiment of the disclosure.

Referring to FIG. 8, a keeper 150 is mounted to both the front and rear faces 126, 128 proximate the top surface 143 of the panel 123. In this exemplary embodiment, the keeper 150 comprises a section of angled ¼" aluminum sheet that is bent at a 35-degree angle to comprise two substantially planar sections 152, 154. The first planar sections 152 of each keeper 150 includes a pair of holes receiving fasteners 158 to mount the keepers 150 to the walls 126, 128 of the panel 123 proximate the top surface 143. It should be understood that the panel 123 includes corresponding through holes (not shown) that are aligned with the through holes of the keepers 150 to accept the fasteners 158. Exemplary fasteners 158 for mounting the keepers 150 include, without limitation, nuts and bolts. Mounting the keepers 150 to the panel 123 creates a tapered opening above the top surface 143. Accordingly, as will be discussed in more detail hereafter, the keepers 150 are operative to provide a tolerance and finder system for an overhead door to ensure that when the overhead door is lowered onto the panel 123, the bottom of the overhead door is longitudinally aligned and seated upon the top 143 of the panel.

Referring back to FIG. 7, in this exemplary embodiment, an aluminum cap 170 is seated upon the top surface 143 and similar aluminum caps (not shown) are seated on the lateral/longitudinal sides of the panel 123. The aluminum caps 170 extend substantially the entire length on top of the panel and aluminum caps extend substantially the entire height of the panel on each side. Each cap 170 comprises a base surface 174 and a pair of perpendicularly extending legs 175 that collectively define an opening having a rectangular cross-section. This rectangular cross-section approximates the rectangular cross-section of the panel 123 so that the front and rear walls 126, 128 of the panel 123 are compression fit within the opening of the cap 170. Those skilled in the art will realize that the caps 170 may be mounted to the panels 123 using other techniques such as, without limitation, adhesives or mechanical fasteners. In addition, those skilled in the art will realize that the legs 175 of each cap 170 are tapered at 45-degree angles (shown as angle "A") in order so that the horizontal and vertical caps 170 to abut one another at the corners of the panel 123.

Figure 9:
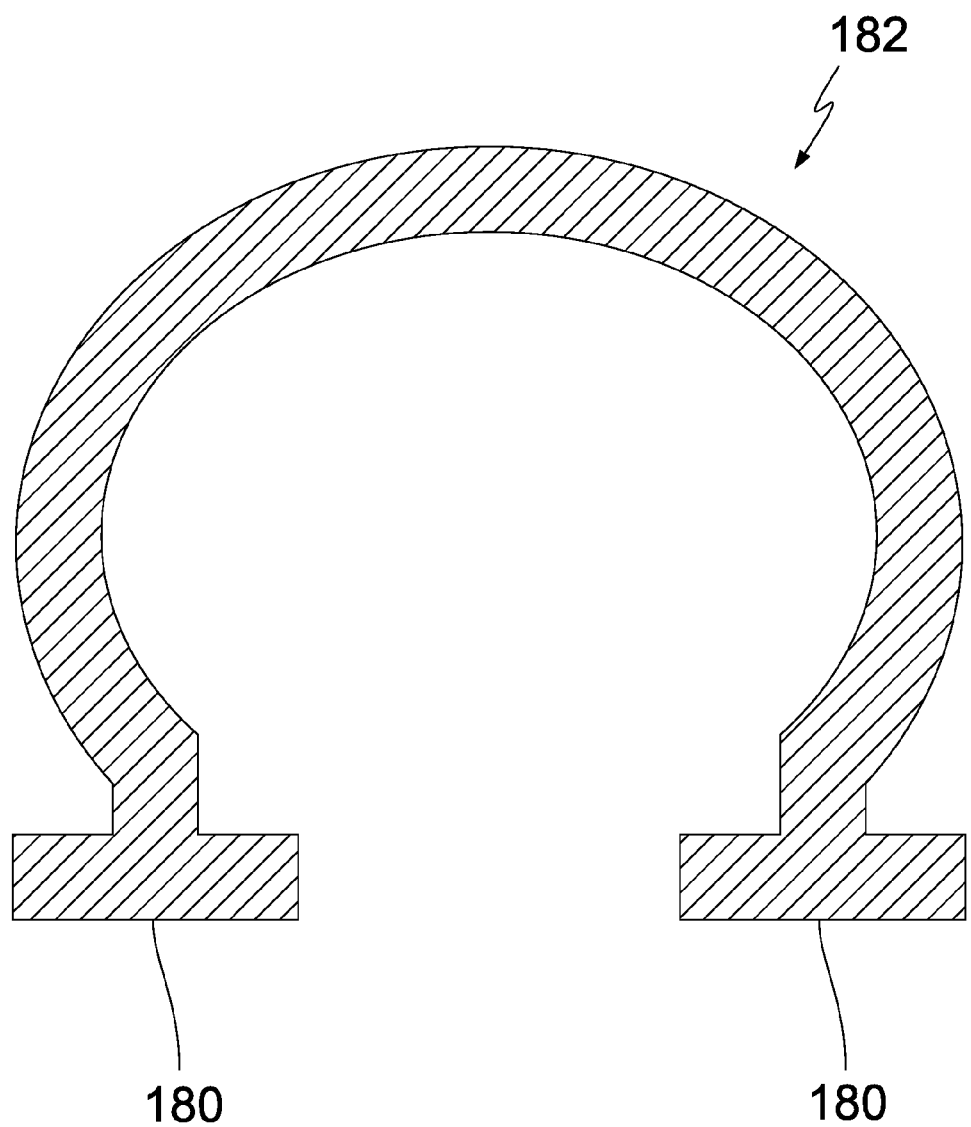
FIG. 9 is a cross-sectional view of weather-stripping for use with the exemplary embodiments of the disclosure.

Referring to FIGS. 7 and 9, opposite the rectangular opening of each cap 170 is a pair of inverted T-shaped cavities 178 defined by corresponding prongs 176. Each cavity 178 is adapted to receive a corresponding T-shaped projection 180 that extends from a rubber, domed seal 182. In this manner, the T-shaped projections 180 of the rubber seal 182 (i.e., weatherstripping) are longitudinally fed into the respective inverted T-shaped cavities 178 to mount the seal 182 to the cap 170 so that the seal extends substantially along the entire length of the cap. As will be discussed in more detail hereafter, the domed seal 182 on top of the panel 123 is sandwiched between the panel and the bottom of an overhead door to substantially inhibit air flow between the bottom of the overhead door and the top of the panel 123. At the same time, the domed seal 182 on both lateral ends of the panel 123 is sandwiched between the panel and the side walls 126, 128 of the pit.

Figure 10:
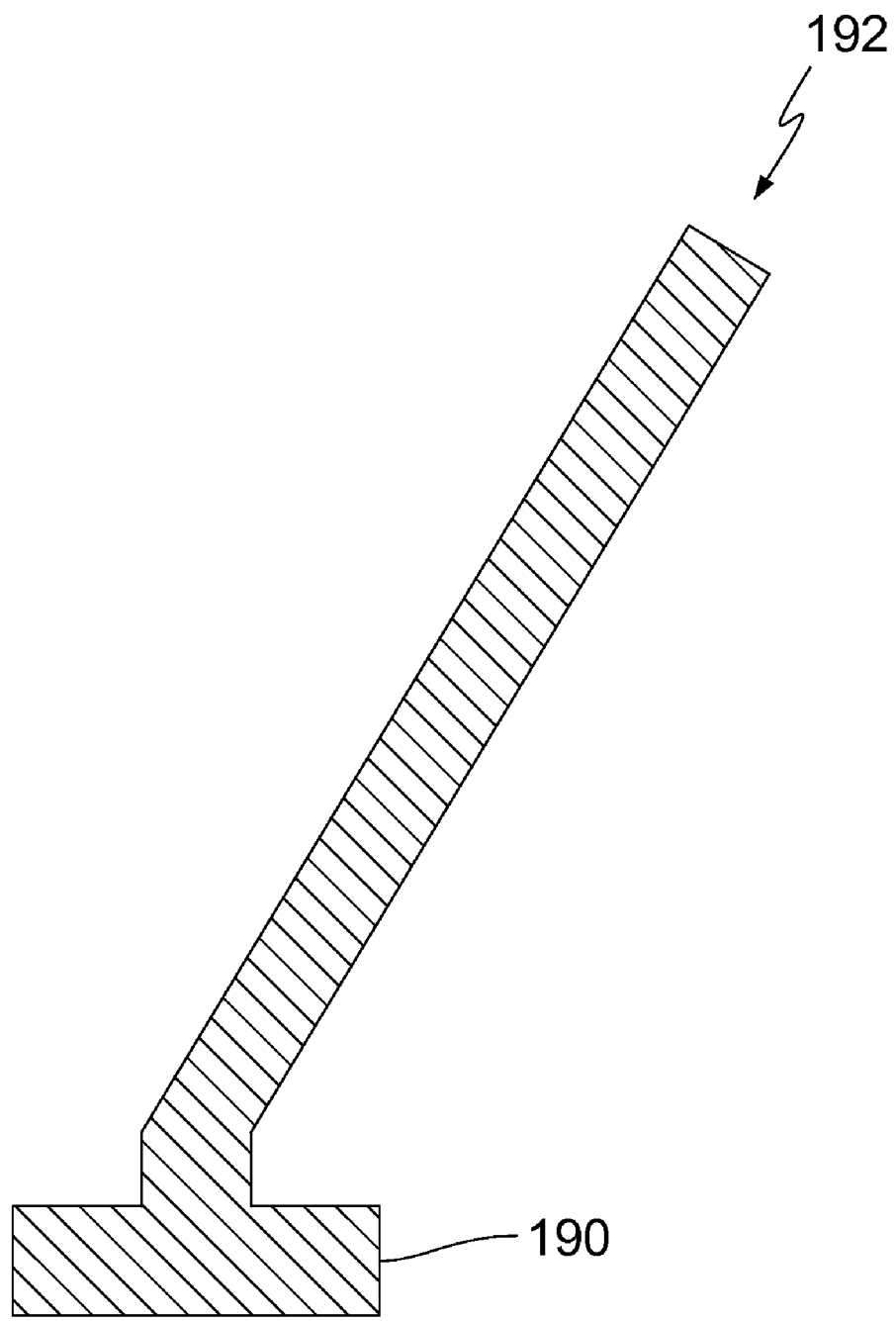
FIG. 10 is a cross-sectional view of further weather-stripping for use with the exemplary embodiments of the disclosure.

Alternatively, referring to FIGS. 7 and 10, the caps 170 on the lateral ends of the panel 123 may only include a single inverted T-shaped cavity 178 to receive a corresponding T-shaped projection 190 that extends from rubber weather stripping 192. In this manner, the T-shaped projection 190 of the weather stripping 192 is longitudinally fed into the respective inverted T-shaped cavity 178 to mount the weather stripping 192 to the cap 170 so that the weather stripping extends along the entire length of the cap. In this manner, the weather stripping 192 on the sides of the panel 123 contacts the right and left side walls 104, 106 of the pit 102 to substantially inhibit airflow between the walls 104, 106 and the panel 123.

Repositioner #1

Figure 11:
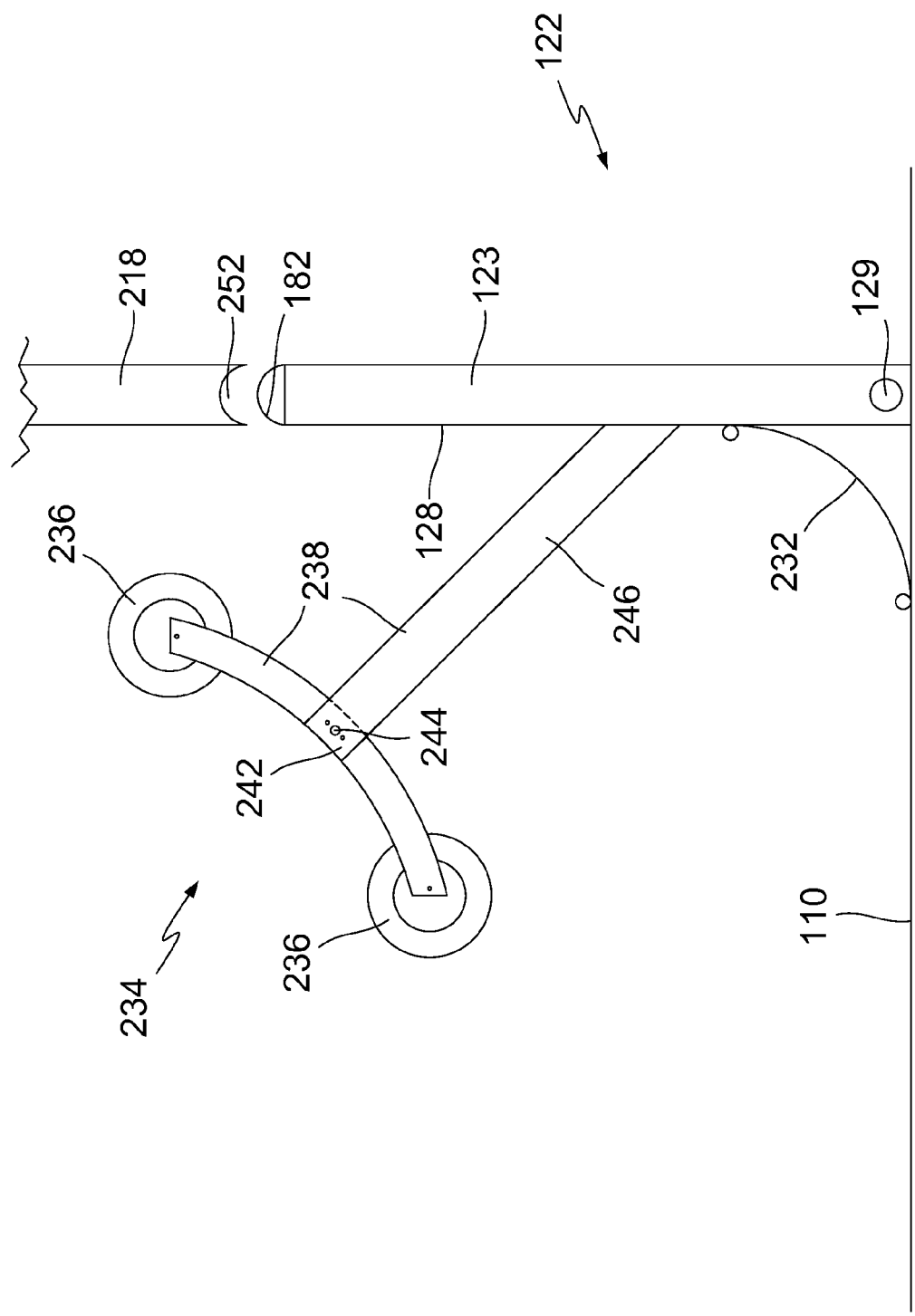
FIG. 11 is a profile view of an exemplary pit seal in accordance with the disclosure.
Figure 12:
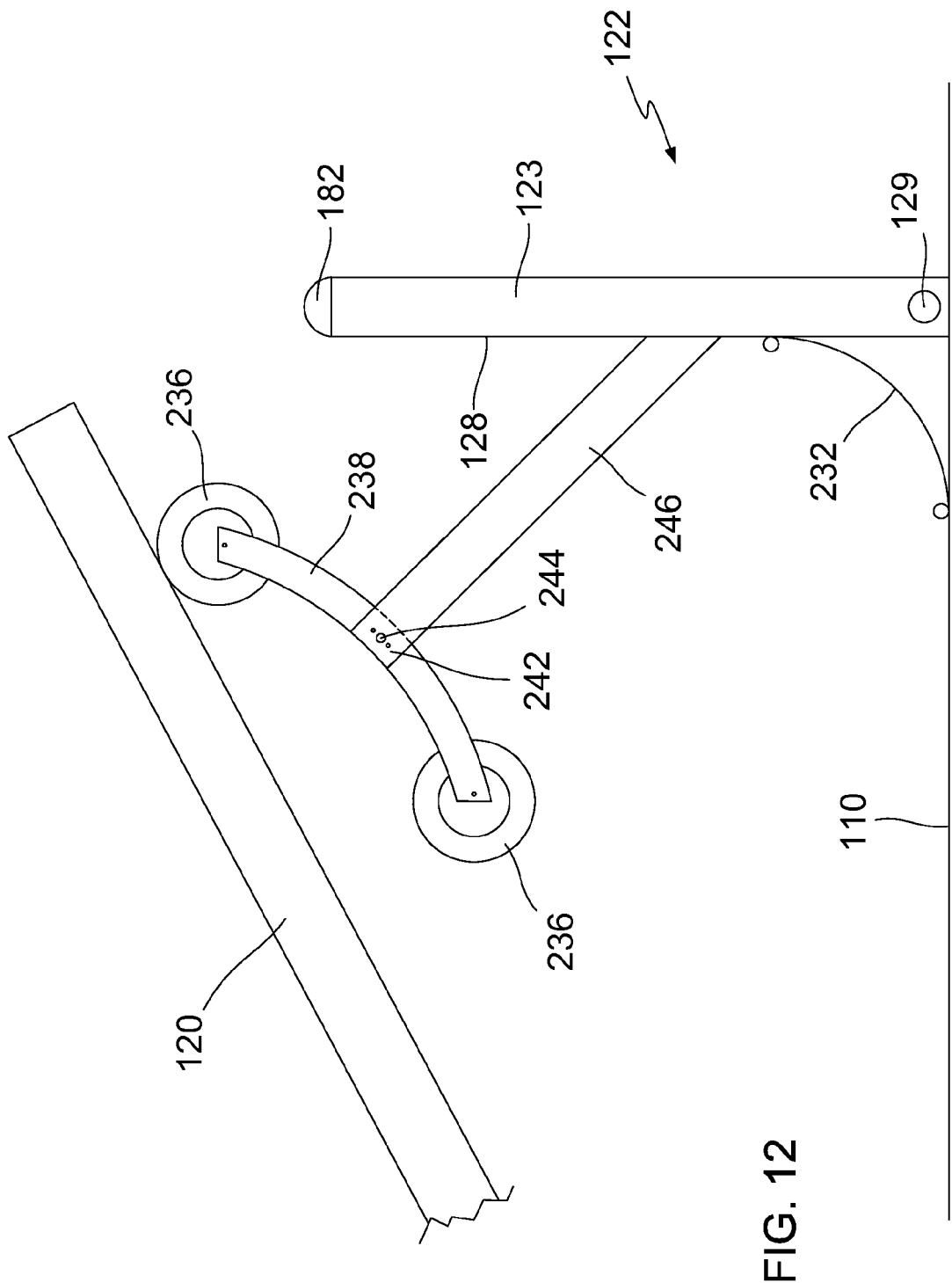
FIG. 12 is a profile view of an exemplary pit seal of FIG. 11, shown in initial engagement with a lowered vertically stored dock leveler.
Figure 13:
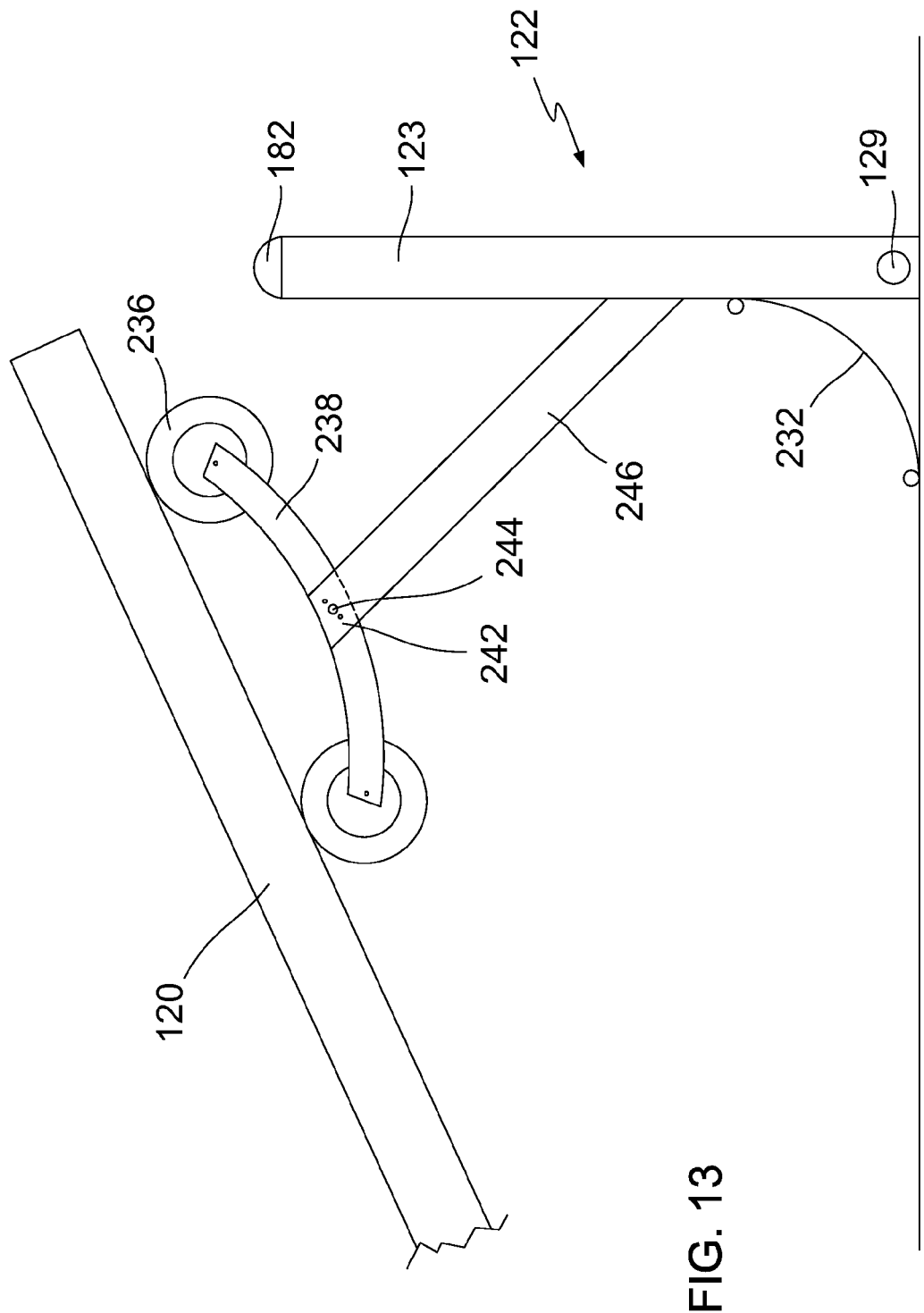
FIG. 13 is a profile view of an exemplary pit seal of FIG. 11, shown in engagement with a lowered vertically stored dock leveler, where the dock leveler is lowered more than shown in FIG. 12.

Referencing FIG. 11, the repositionable pit door 122 may optionally include an exemplary repositioning device selectively engaged by the VSDL 120 to reposition the panel 123 between a vertical deployment position and a horizontal or near horizontal storage position. Each repositioning device includes at least one engagement device 234 mounted to the interior face 128 of the panel 123. The engagement device 234 is operative to contact the VSDL 120 so that as the VSDL is lowered, the engagement device overcomes the bias of springs, such as leaf springs 232, mounted to the pit seal panel 123. When the panel 123 is in its default upright barrier position (see FIG. 11), the leaf springs 232 provide a bias to maintain the panel in its vertical orientation.

Each engagement device 234 includes a pair or rollers 236 mounted to opposite ends of an arcuately shaped bracket 238. In this exemplary embodiment, each roller 236 is freely rotatable with respect to the bracket 238 in order to accommodate a rolling motion against the underside of the VSDL 120. The bracket 238 includes a through hole that is adapted to receive a pin 244 that also extends through a clevis 242 at one end of an extension 246. In this manner, the arcuate bracket 238 is operable to pivot with respect to the extension 246 about the pin 244. As will be discussed in more detail below, pivoting occurs during raising and lowering of the panel 123 as the rollers 236 contact the underside of the VSDL 120. Finally, the end of the extension 246 opposite the clevis 242 is mounted to the interior surface 128 of the panel 123 using conventional fasteners, such as bolts (not shown).

As discussed previously, the top of the panel 123 includes the domed seal 182 that is adapted to be correspondingly received within a concave cavity 252 on the bottom of a conventional overhead door 218. However, it is also within the scope of the disclosure that the bottom of the overhead door 218 be planar or exhibit a convex shape. Regardless of the shape of the bottom of the overhead door 218, the domed seal 182 closes off gaps between the overhead door 218 and the panel 123 when the overhead door is lowered and the panel 123 is vertically oriented. In exemplary form, many overhead doors 218 have weather-stripping mounted to the bottom in order to form a seal with the ground. Thus, it may be advantageous to remove the weather-stripping from the bottom of the overhead door 218 to form an appropriate connection with the domed seal 182 of the panel 123.

Referencing FIG. 12-15, when the VSDL 120 is repositioned from its vertical storage position to its horizontal use position, the pit seal 122 is also repositioned so as not to interfere with operation of the VSDL 120. In operation, as the VSDL 120 is pivoted from its vertical storage position to a horizontal or near horizontal use position, the underside of the VSDL 120 initially contacts the top roller 236 mounted to the arcuate bracket 238 (see FIG. 12). Continued downward movement of the VSDL 120 against the top roller 236 causes the arcuate bracket 238 to pivot with respect to the extension 246, about the pin 244, until the bottom roller 236 contacts the underside of the VSDL 120 (see FIG. 13). At this point, the panel 123 remains in its vertical barrier position. But further downward movement of the VSDL 120 against the rollers 236 is operative to push the arcuate bracket 238 downward and correspondingly pivot the bracket 238 about the pin 244 with respect to the extension 246 until the clevis 242 limits the pivoting.

Figure 14:
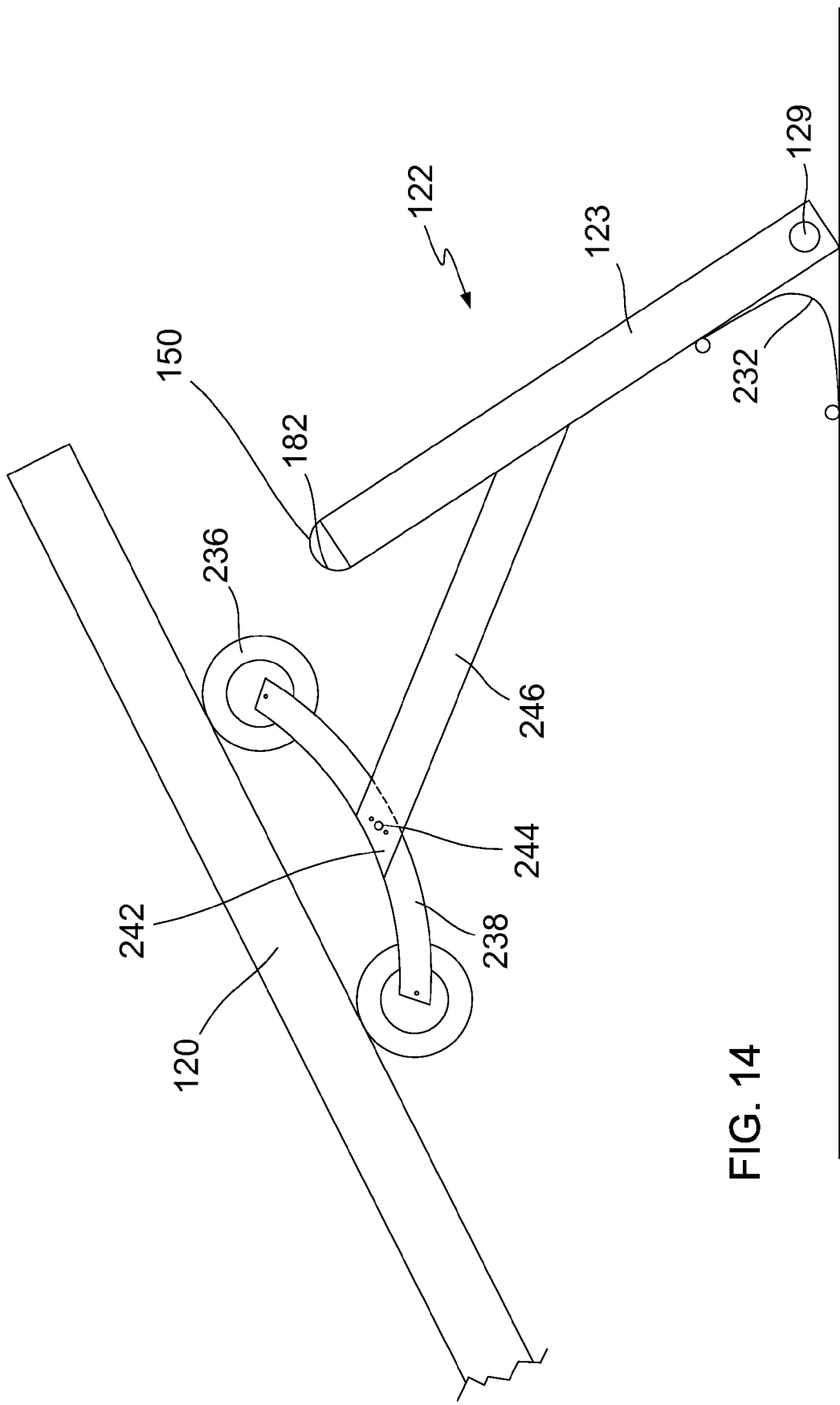
FIG. 14 is a profile view of an exemplary pit seal of FIG. 11, shown in engagement with a lowered vertically stored dock leveler, where the dock leveler is lowered more than shown in FIG. 13.
Figure 15:
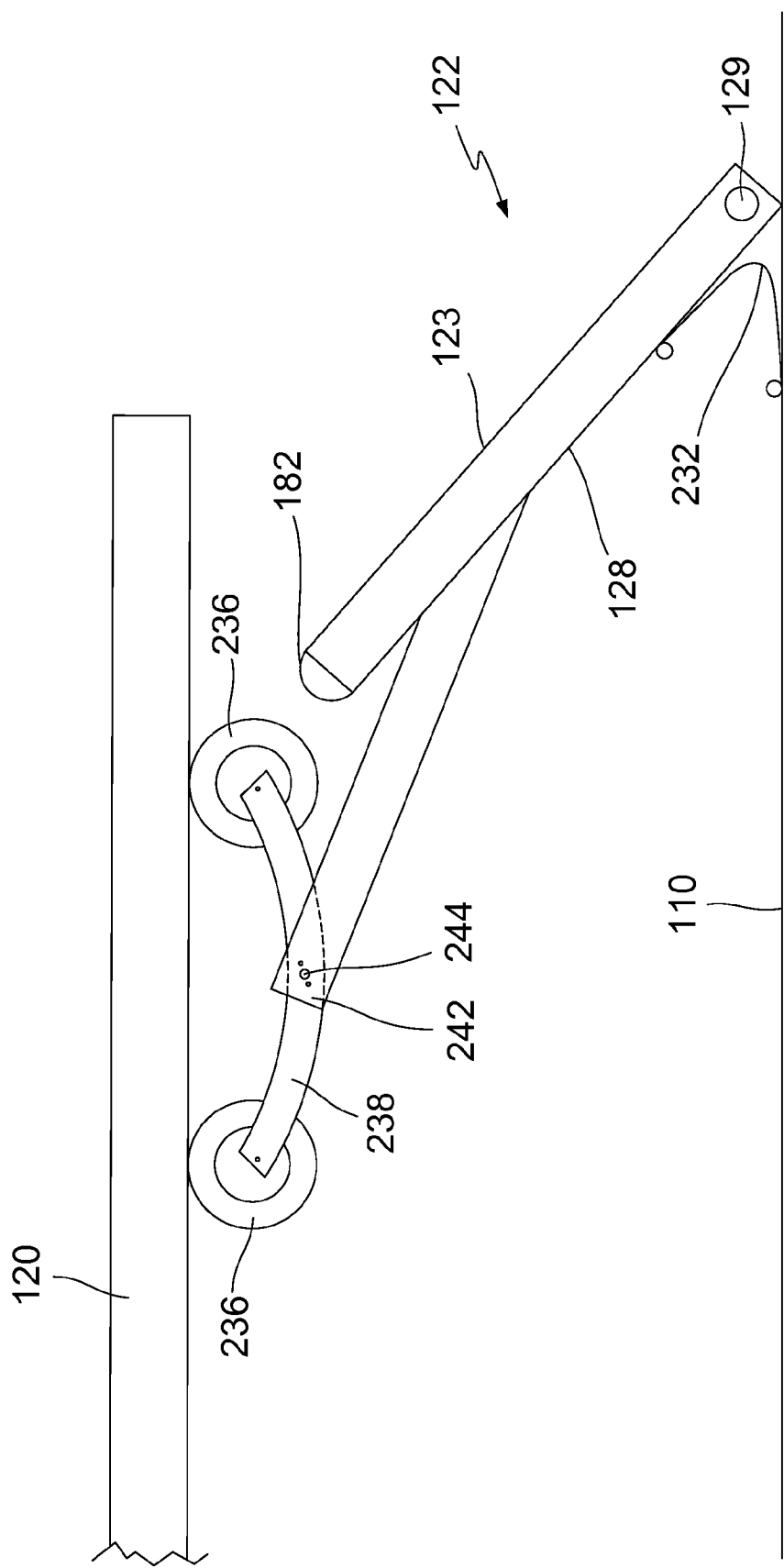
FIG. 15 is a profile view of an exemplary pit seal of FIG. 11, shown in engagement with a lowered vertically stored dock leveler, where the dock leveler is lowered more than shown in FIG. 14.

Referring to FIGS. 14 and 15, continued downward movement of the VSDL 120 causes the rollers 236 to roll against the underside of the VSDL toward the pivot point of the VSDL. At the same time, the binding of the clevis 242 against the arcuate bracket 238 pulls the top of the panel 123 rearward toward the pivot point of the VSDL (see FIG. 14). But because the panel 123 is pivotally mounted at the bottom to the dowels 129, this rearward pulling action is converted into a pivoting action that causes the panel to move from a vertical barrier position toward a horizontal or near horizontal storage position under the VSDL 120. This pivoting action, caused by direct contact with the VSDL 120, is operative to overcome the bias of the leaf springs 232 and allow the panel 123 to be pivoted rearwardly. Continued downward movement of the VSDL 120 to approximate its horizontal use position corresponds with the rollers 236 continuing their rolling contact the underside of the VSDL to reach a position that most closely approximates the VSDL pivot point of any position the rollers occupy while in contact with the VSDL. This same rearward most position of the rollers 236 also corresponds to the maximum pivoting or deflection of the panel 123 so that the panel reaches its horizontal or near horizontal storage position (see FIG. 15). An opposite sequence when raising the VSDL 120 to its vertical storage position allows the panel 123 to return to its vertical barrier position, in part, using the bias of the leaf springs 232.

Referring back to FIG. 15, as the VSDL 120 is raised to its vertical storage position, the pit seal 122 also returns to its default vertical barrier position. In exemplary form, as the VSDL 120 is pivoted upward (compare FIG. 15 with FIG. 14), the rollers 136 roll against the underside of the VSDL 120. This is caused by the bias of the leaf springs 232 against the rear of the panel 123, which correspondingly forces the panel 123, extension 246, and bracket 238 upward. Further upward pivoting movement of the VSDL 120 is accompanied by pivoting of the pit seal 122 until both rollers 236 are no longer in contact with the underside of the VSDL 120, which corresponds with the panel 123 arriving at its vertical barrier position. At this point, only the top roller 236 remains engaged and thus the bottom roller 236 of the bracket 238 pivots toward the interior surface 128 of the panel 123. Ultimately, the top roller 136 looses contact with the underside of the VSDL 120 as the VSDL is pivoted to more closely approximate its vertical storage position.

Referring back to FIGS. 4 and 11, after the VSDL 120 has cleared the top roller 236 and approximates its vertical storage position, the overhead door 118, 218 may be lowered to close off the loading dock 100 opening. In exemplary form, the overhead door 118, 218 is lowered so that its bottom engages the top surface of the pit seal panel 123 to close off the loading dock 100 opening. When a conventional panel overhead door 118, 218 is fully lowered, the door may be locked in its fully lowered position by repositioning a slide mounted to one of the door panels so that the slide engage an opening (not shown) in the a C-track 114. Those skilled in the art are familiar with overhead door locks and a further explanation has been omitted for purposes of brevity. When the overhead door 118, 218 is in its fully lowered position on top of the pit seal panel 123, the pit seal panel 123 cannot be pivoted. As a result, locking the overhead door 118, 218 in its fully lowered position is likewise operative to lock the pit seal panel 123 in its vertical barrier position.

It is also within the scope of the invention for the bottom panel of the overhead door 118, 218 and/or the pit seal 122 to include fasteners to lock the bottom panel of the overhead door to the pit seal panel 123. In the alternative, the bottom panel of the overhead door 118, 218 and/or the pit seal panel 123 may include dowels that engage corresponding cavities in the opposite structure in order to prohibit the pit seal panel 123 from pivoting inward toward the VSDL when the overhead door 118, 218 is fully lowered to contact the top of the pit seal panel 123, specifically the weatherstripping 182.

While the foregoing embodiment has been described with the pit seal 122 being spring biased toward the vertical position so that contact with the VSDL 120 overcomes the spring bias to reposition the pit seal to its nearly horizontal storage position, it is also within the scope of the invention to include a mechanical linkage between the VSDL 120 and the pit seal 122 to pivot the panel 123 downward as the VSDL is pivoted downward, and vice versa.

Figure 16:
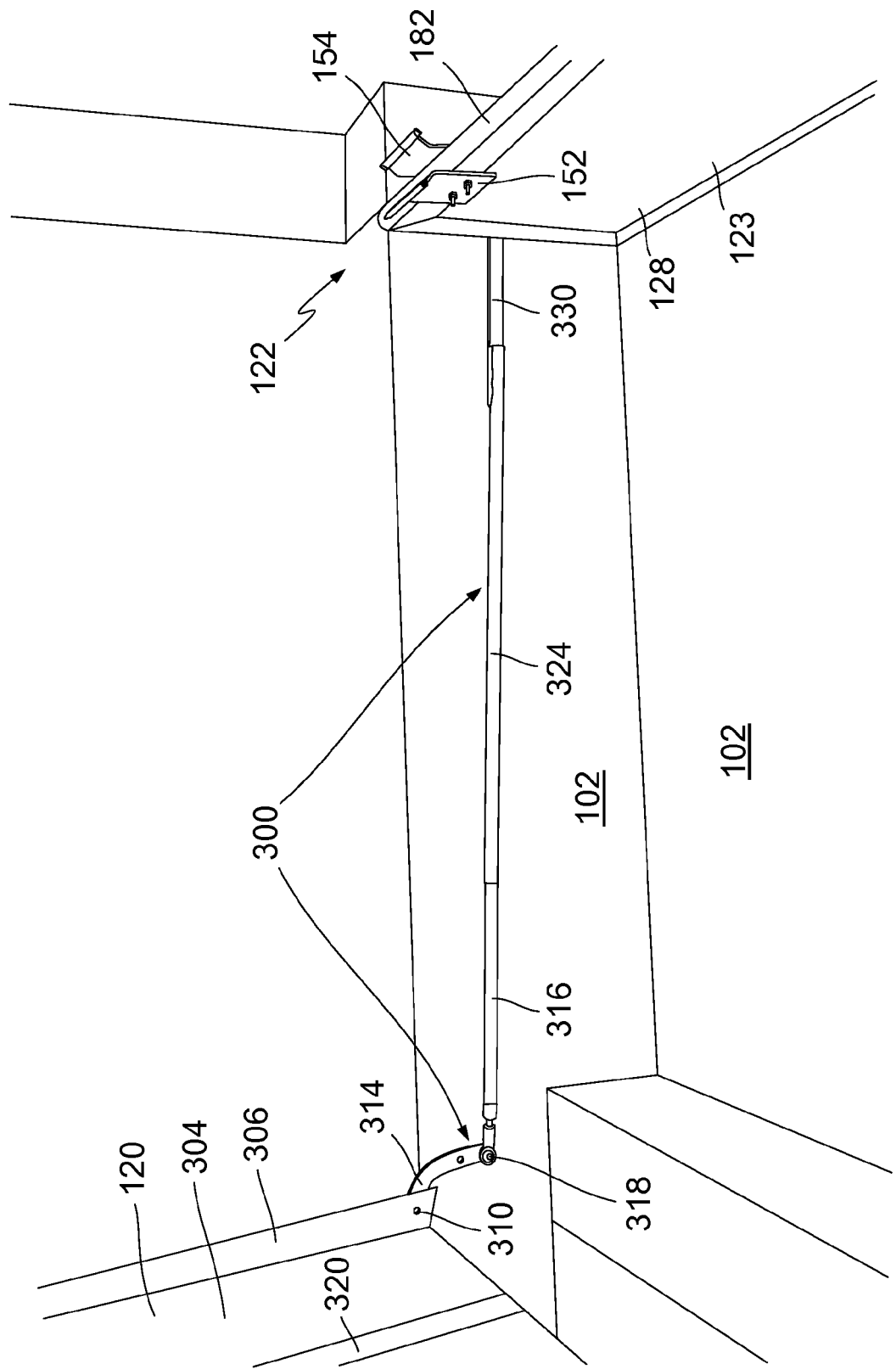
FIG. 16 is a profile view of the left side of an exemplary pit having an exemplary pit seal installed and mounted to a vertically stored dock leveler.
Figure 17:
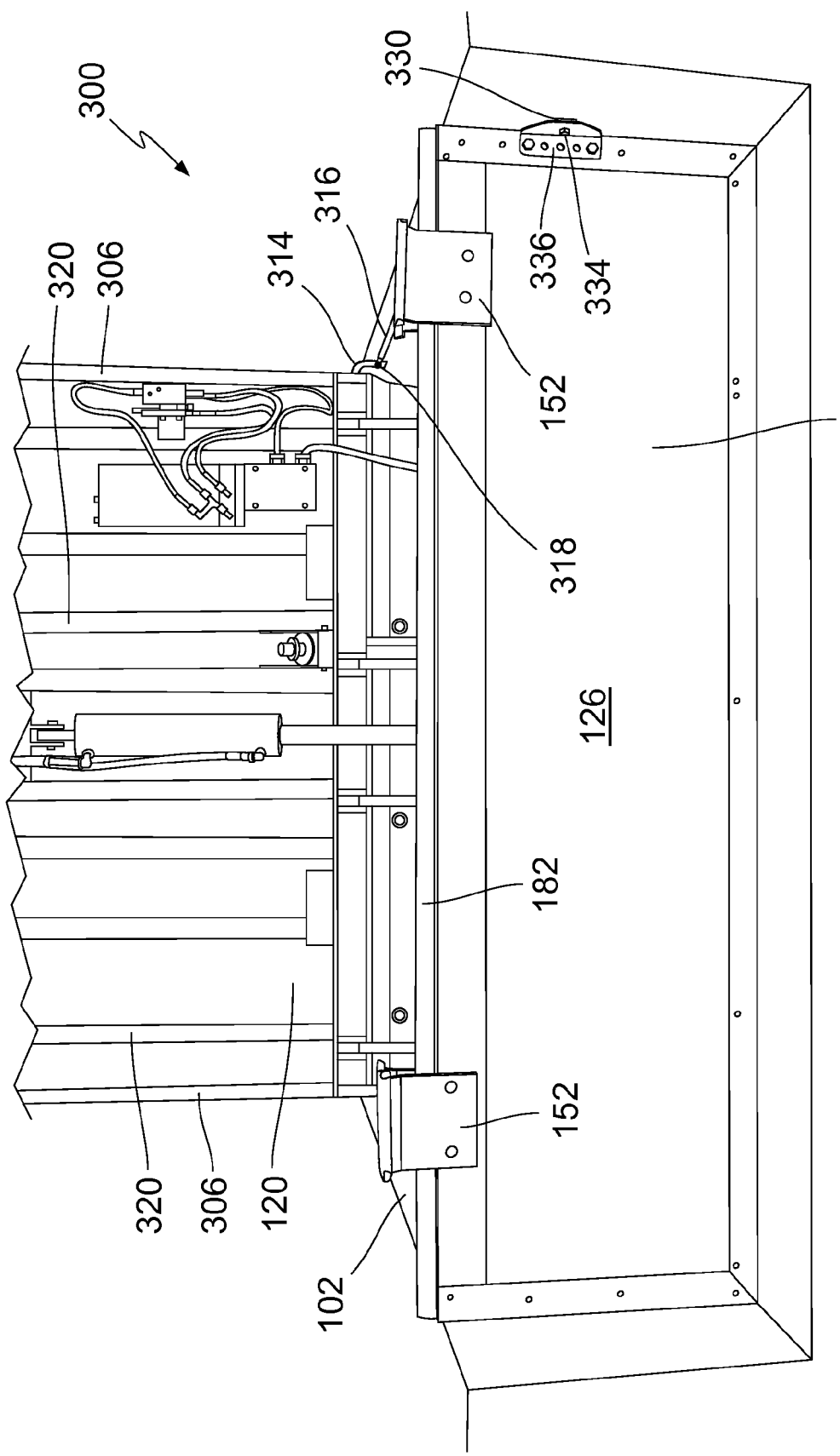
FIG. 17 is a frontal view of the exemplary pit seal of FIG. 16 installed and mounted to a vertically stored dock leveler.
Figure 18:
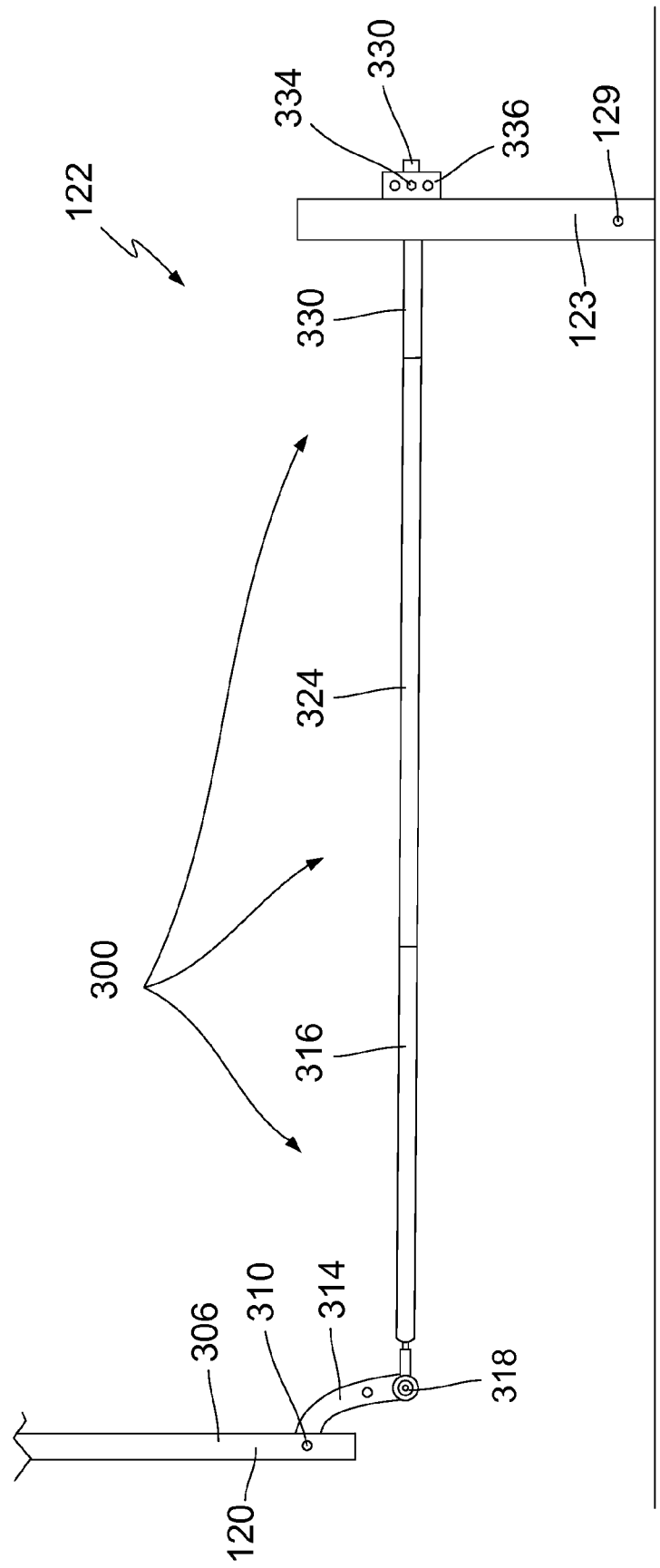
FIG. 18 is a profile view of the mechanical linkage between the exemplary pit seal of FIG. 16 and a vertically stored dock leveler.
Figure 19:
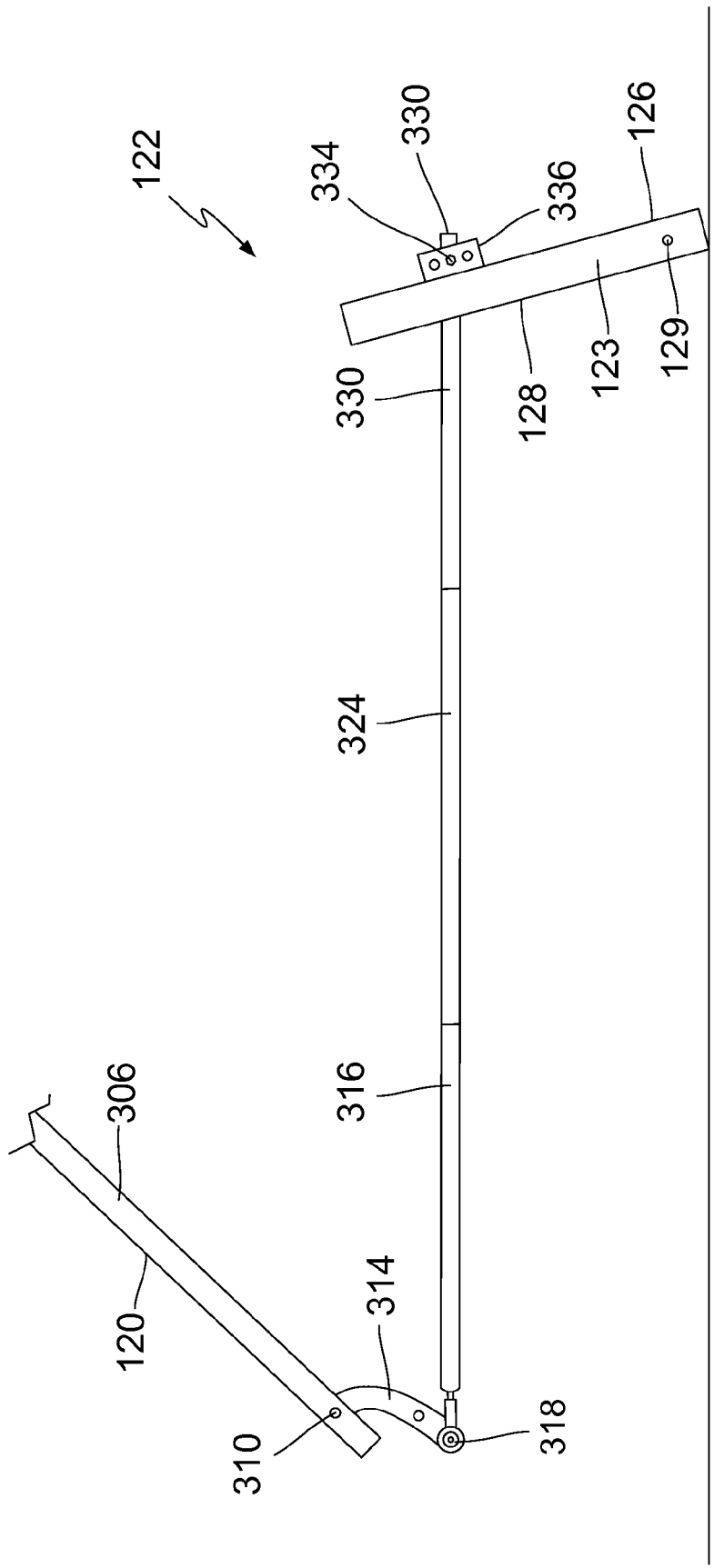
FIG. 19 is a profile view of the mechanical linkage of FIG. 18 when the vertically stored dock leveler is lowered beyond that shown in FIG. 18.
Figure 20:
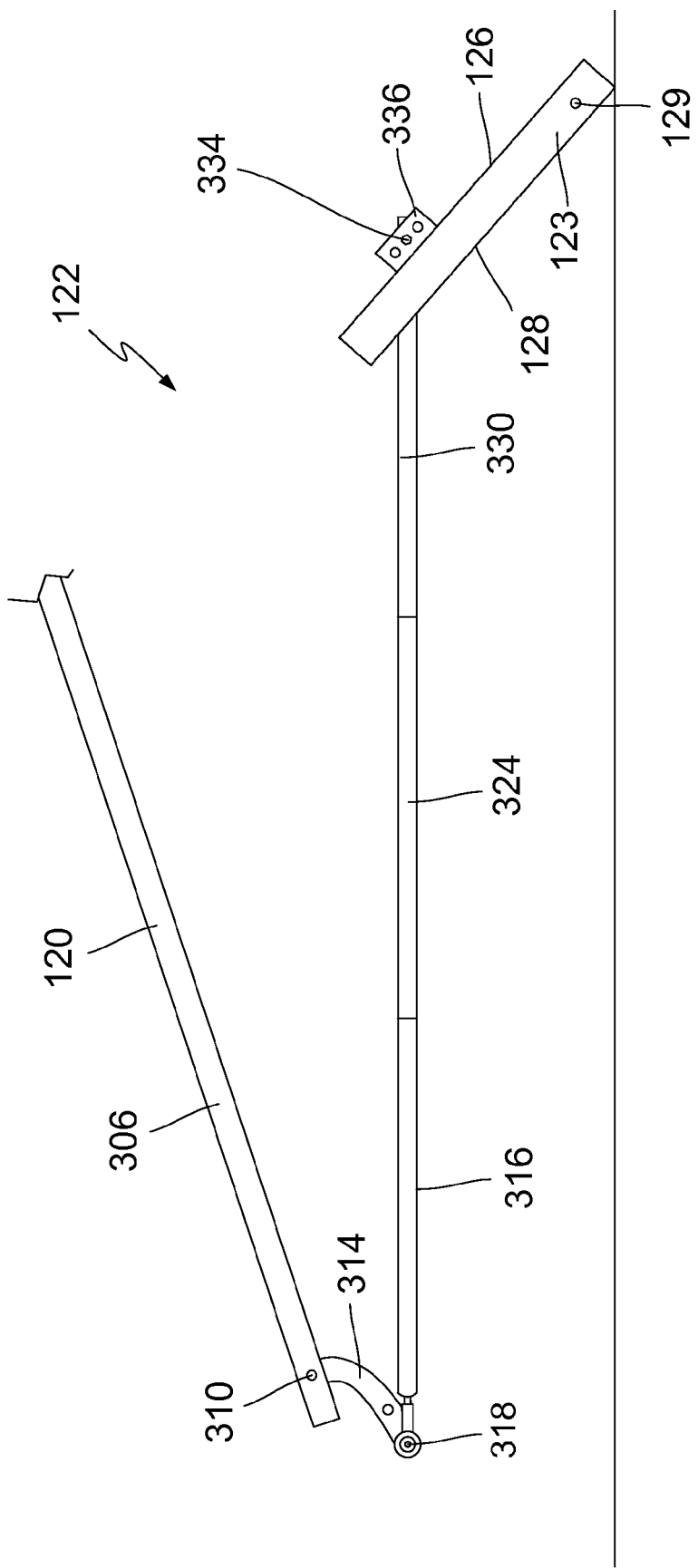
FIG. 20 is a profile view of the mechanical linkage of FIG. 18 when the vertically stored dock leveler is lowered beyond that shown in FIG. 19.
Figure 21:
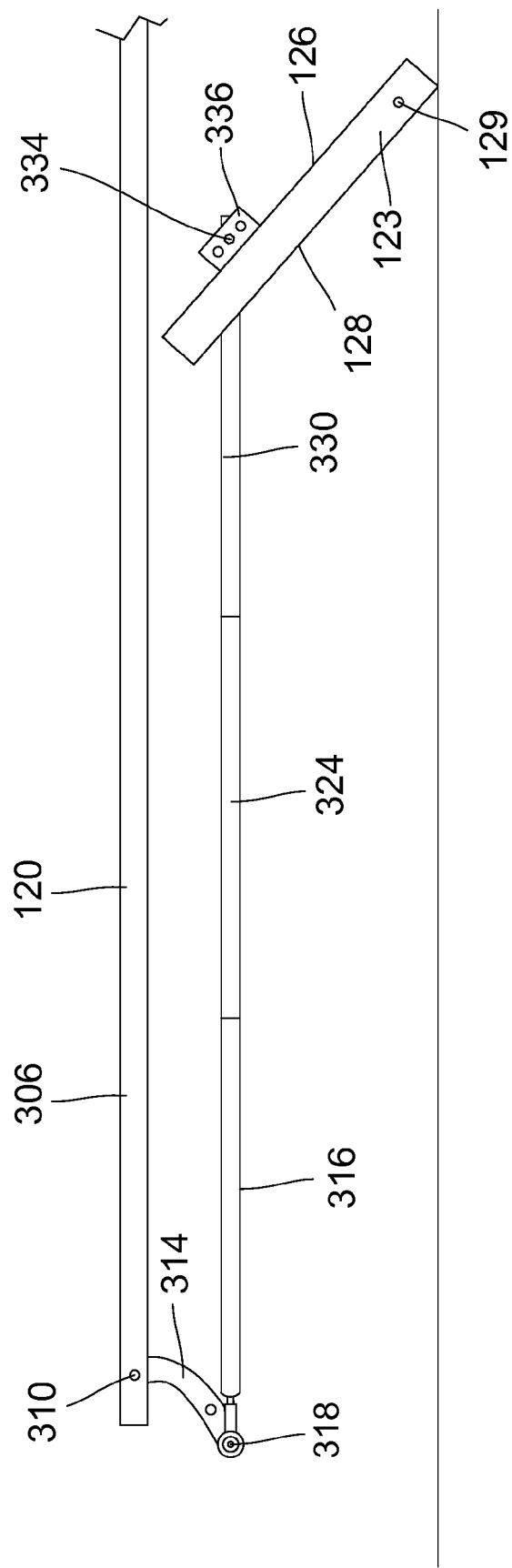
FIG. 21 is a profile view of the mechanical linkage of FIG. 18 when the vertically stored dock leveler is lowered beyond that shown in FIG. 20.

Referring to FIGS. 16 and 17, a mechanical linkage 300 is operative to reposition the pit seal 122 between its barrier and storage positions. The VSDL 120 is repositionable between a vertical storage position and a horizontal use position. Structurally, the VSDL 120 includes a plurality of structural braces 320 that extend linearly underneath decking 304, which provides a working surface when the VSDL is in its horizontal use position. A pair of outermost flanges 306 extend perpendicularly from an edge of the decking 304 and underneath the decking. These outermost flanges 306 are inset within the pit 102 when the VSDL 120 is in its horizontal use position. At the same time, one of the outermost flanges 306 includes a through hole that receives a bolt 310 of the mechanical linkage 300 to physically connect the VSDL to the pit seal 122.

An exemplary mechanical linkage 300 includes an arcuate, right angled bracket 314 fabricated from quarter-inch bar stock. One end of the bracket 314 includes a through hole that receives the bolt 310 concurrently extending through one of the outermost flanges 306 in order to mount the bracket to the flange. An opposite end of the bracket 314 also includes a through hole receiving a ball of a ball joint coupling 318. The ball of the ball joint coupling 318 is secured to the bracket 314 using a conventional nut (not shown). A complementary half of the ball joint coupling 318 includes a threaded control arm 316 which is mounted to a threaded cylindrical tube 324 at an opposite end. Another end of the cylindrical tube 324 is welded to a section of bar stock 330 having a circular opening (not shown) formed at an end opposite the cylindrical tube 324. This circular opening receives a cylindrical pin 334 that is mounted to a right angle bracket 336. This right angle bracket 336 is mounted to the front wall 126 of the repositionable panel 123. In this exemplary embodiment, the pin 334 extends slightly laterally beyond the panel 123 just enough to extend through the circular opening of the bar stock 330. The end of the pin 334 that extends beyond the bar stock 330 may include a linchpin or some other means to maintain the pin 334 within the opening in the bar stock 330 as the VSDL 120 is repositioned between its horizontal use position and its vertical storage position.

Referring to FIGS. 18-21, an exemplary sequence of repositioning the pit seal 122 from its vertical barrier position to its near horizontal storage position begins with raising any overhead door out of the line of travel of the VSDL 120. Thereafter, the VSDL 120 is pivoted proximate the rear of the pit (see FIG. 16) so that the decking goes from a vertical storage position (see FIG. 18) to a horizontal use position (see FIG. 21). During the pivoting of the VSDL 120, the mechanical linkage 300 concurrently attached to the panel 123 and the VSDL 120 is operative to transfer the downward pivoting motion of the VSDL into downward pivoting motion of the panel. In other words, as the VSDL 120 is pivoted downward, from vertical to horizontal, so too are the outermost flanges 306. Also, because the one of the flanges 306 is rigidly mounted to the bracket 314, pivotal movement of the flange also results in pivotal movement of the bracket. The arcuate nature of the bracket 314 works with the arcuate path of the bolt 310 to convert the arcuate motion of the VSDL 120 into horizontal pulling motion on the threaded control arm 316, the threaded cylindrical tube 324, and the bar stock 330. This horizontal pulling motion of the bar stock 330 is transferred to the panel 123 by way of the pin 334 and the right angle bracket 336. Because the bottom of the panel 123 is pivotally mounted to the floor of the pit, horizontal movement at the top of the panel 123 is converted into pivotal motion of the entire panel 123. The sequence of motion to reposition the pit seal panel 123 from a vertical barrier position to a near horizontal storage position is shown by a series of snapshots as depicted in FIGS. 18-21. Conversely, raising the pit seal panel 123 from its storage position to its barrier position occurs as the VSDL 120 is pivoted from a horizontal to a vertical storage position. While the foregoing exemplary embodiment has used a solid mechanical linkage, other forms of linkage may be utilized to reposition the pit seal panel 123 responsive to motion of the VSDL 120.

Figure 22:
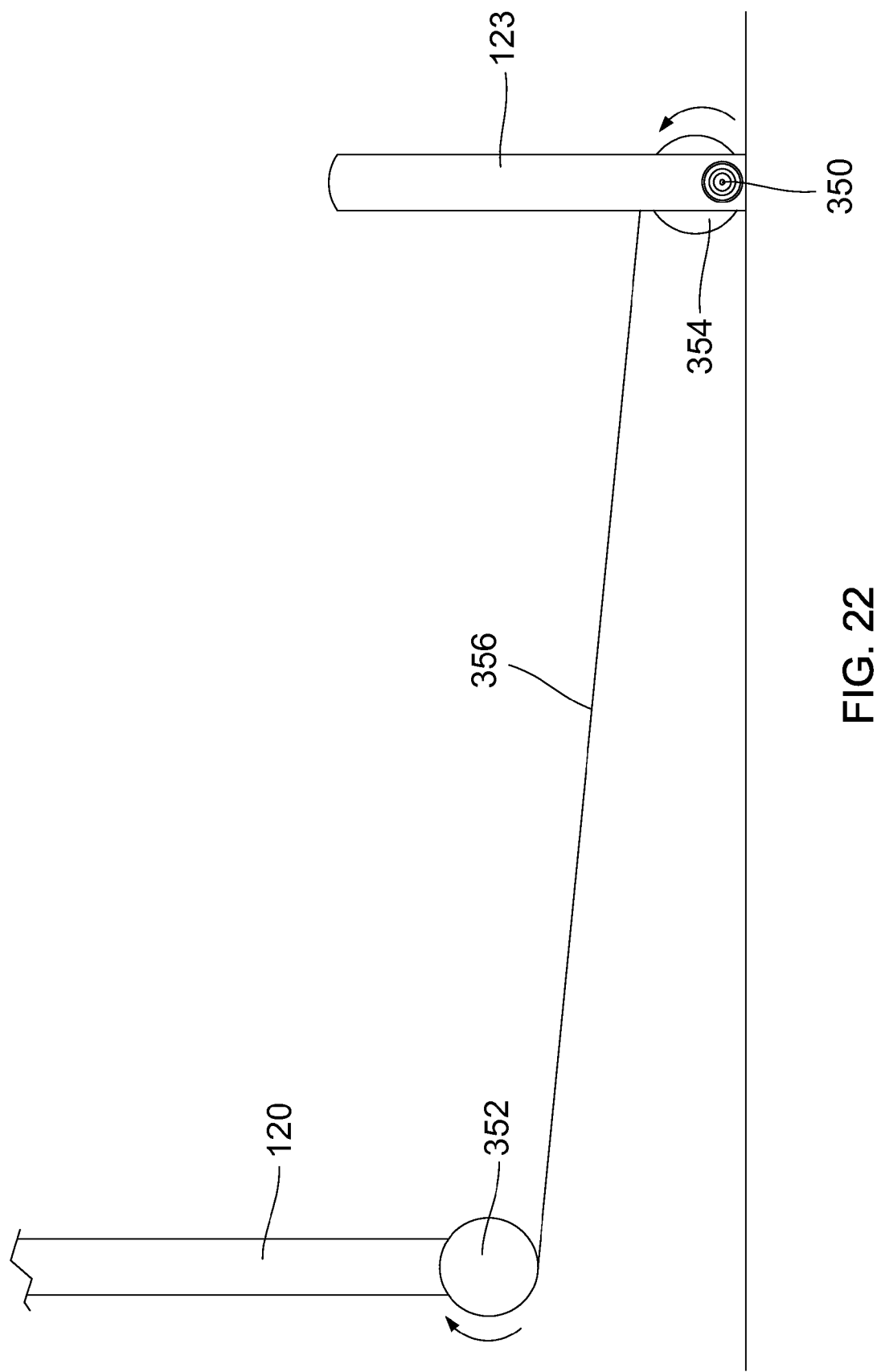
FIG. 22 is a profile view of an alternate mechanical linkage between the exemplary pit seal and a vertically stored dock leveler when the dock leveler is positioned in its vertical storage position.
Figure 23:
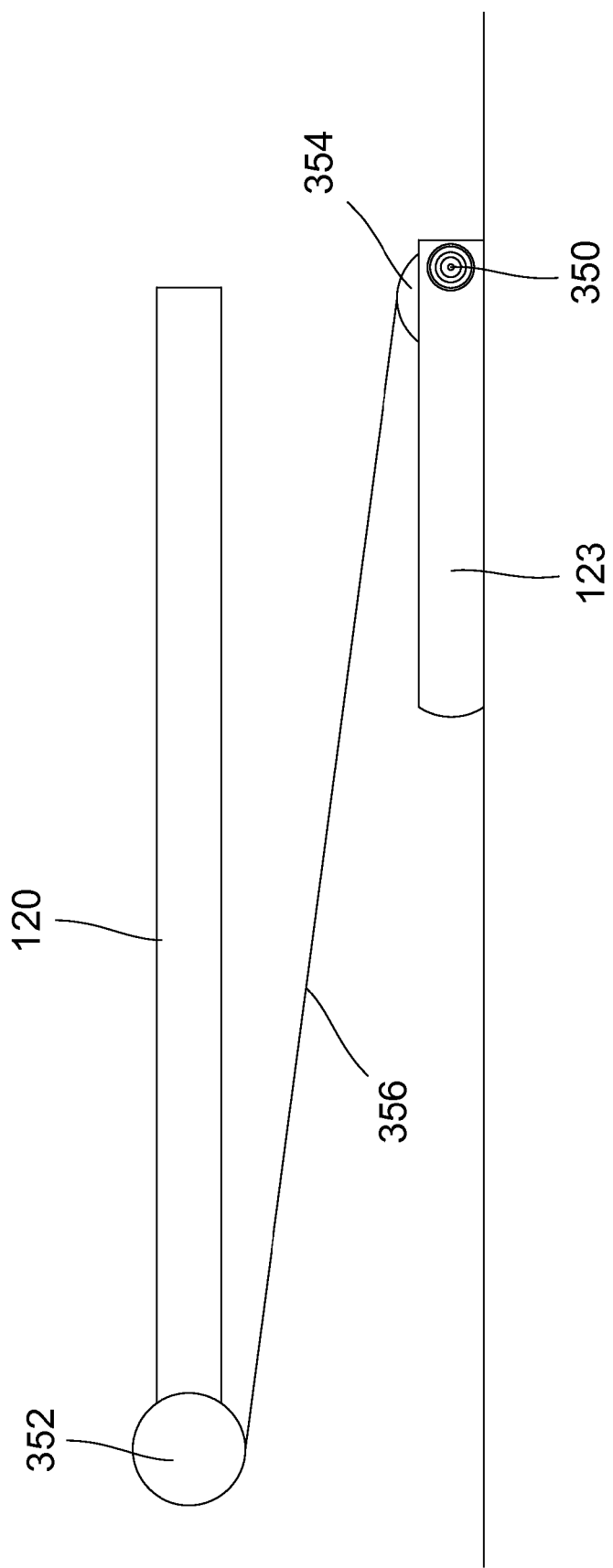
FIG. 23 is a profile view of an alternate mechanical linkage of FIG. 22 showing the position of the between the exemplary pit seal of FIG. 23 and a vertically stored dock leveler when the dock leveler is lowered to its horizontal use position.

Referring now to FIGS. 22 and 23, in exemplary form, the pit seal panel 123 may be spring biased using a torsion spring 350 mounted concurrently to the panel and to the pit wall. In this exemplary embodiment, the panel 123 is biased toward its vertical barrier position. However, a cable 356 is concurrently mounted to the VSDL 120 and the panel 123 using separate pulleys 352, 354. Each of the pulleys 352, 354 is rigidly attached to either the VSDL 120 or the panel 123 so that pivoting motion of the VSDL 120 and panel 123 is correspondingly transferred to the respective pulley as rotational motion, and vice versa. In this fashion, as the VSDL 120 is pivoted downward from its vertical storage position and toward its horizontal use position, the pulley 352 mounted to the VSDL is rotated in a clockwise fashion. This clockwise rotation is operative to pull on the cable 356 toward the first pulley 352 and away from the second pulley 354. As a result, the cable 356 necessarily transfers the clockwise rotation of the first pulley 352 into counterclockwise rotation of the second pulley 354. This counterclockwise motion of the second pulley 354 causes the panel 123 to pivot rearward toward the VSDL 120, which is resisted by the torsion spring 350. But the force on the cable 356 is large enough to overcome the spring bias exerted by the torsion spring 350, thereby repositioning the panel 123. In this manner, continued rotation of the first pulley 352 from the pivoting of the VSDL 120 is operative to continue pulling on the cable 356 and continue rotating the second pulley 354 until the VSDL reaches its horizontal use position (see FIG. 23).

It is also within the scope of the disclosure to include a servo motor (not shown) coupled to the first pulley 352 or the second pulley 354 instead of the VSDL 120. A feedback control sensor (not shown) would detect downward and upward pivoting motion of the VSDL and cause the servo motor to rotate the pulley(s) 352, 354 clockwise or counterclockwise to raise or lower the panel 123. In exemplary form, the sensor may be tied into the control panel of the VSDL 120 to directly sense instructions to the hydraulic motors of the VSDL 120 and respond appropriately with the correct servo motor motion in order to properly position the panel 123 between a vertical barrier position and a near horizontal storage position. Those skilled in the art are familiar with control panels for VSDLs and a detailed discussion of this feature has been omitted only for purposes of brevity.

Repositioner #2

Figure 24:
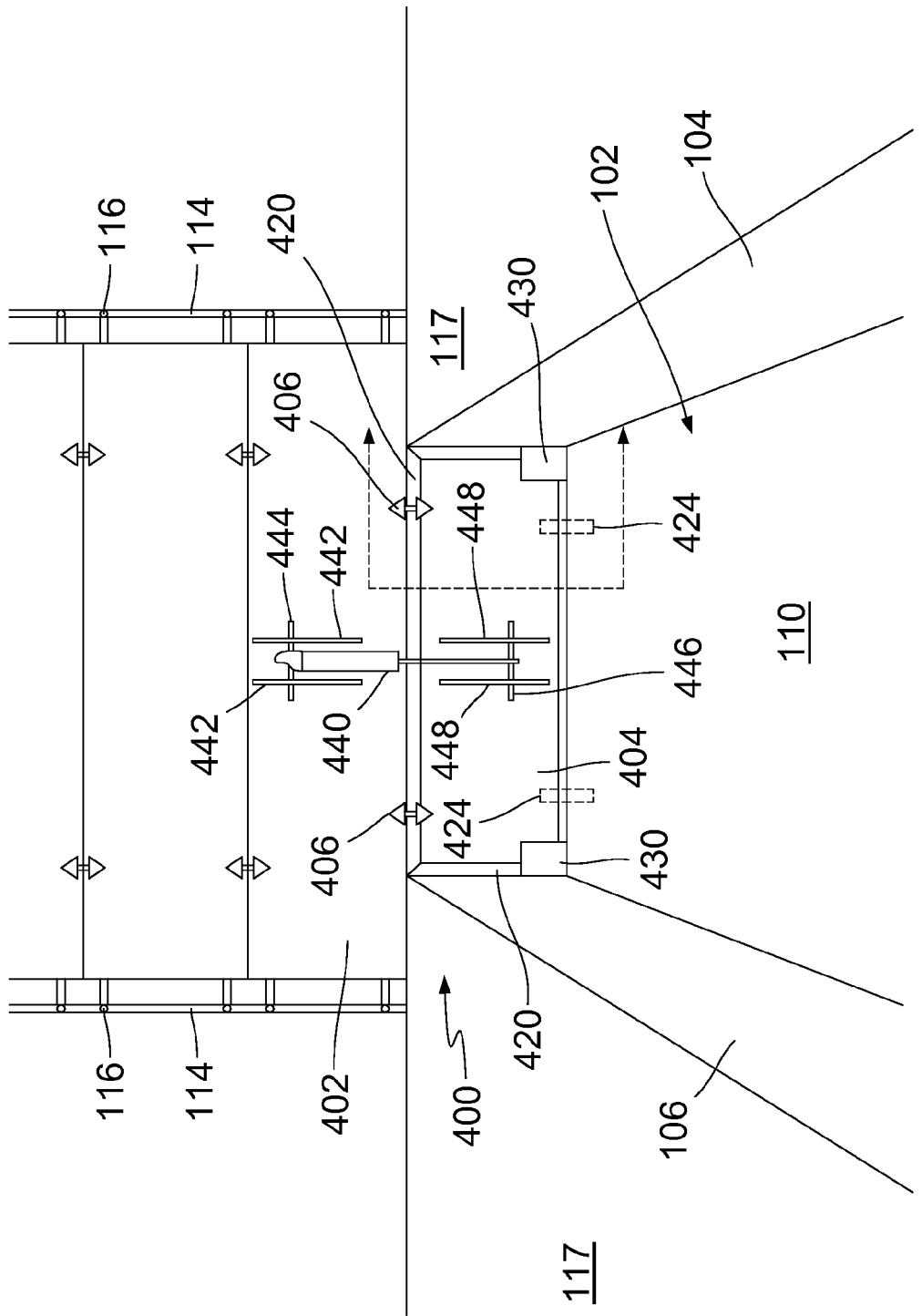
FIG. 24 is a rear view of an exemplary pit seal mounted to a conventional overhead door, where the pit seal is shown in its vertical barrier position and where the overhead door is shown in its closed position.
Figure 25:
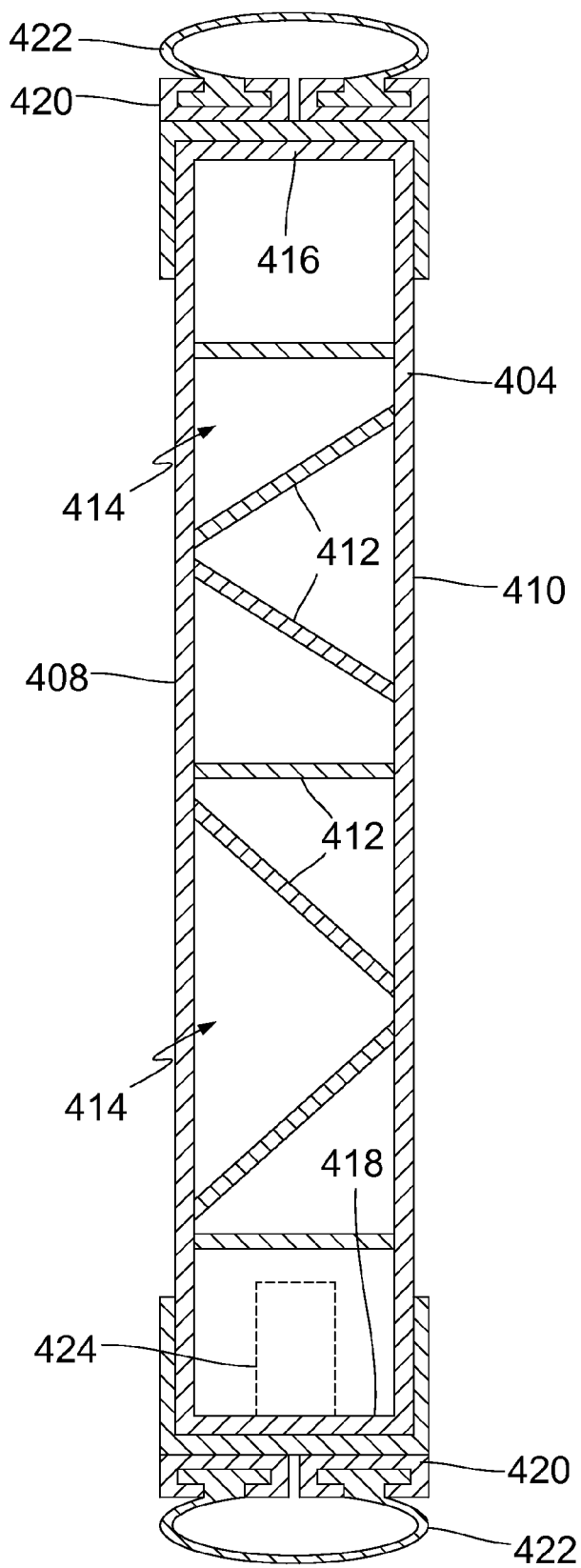
FIG. 25 is a cross-sectional view of the exemplary pit seal panel, weather-stripping retainer, and weather-stripping comprising a part of the exemplary pit seal of FIG. 24.
Figure 26:
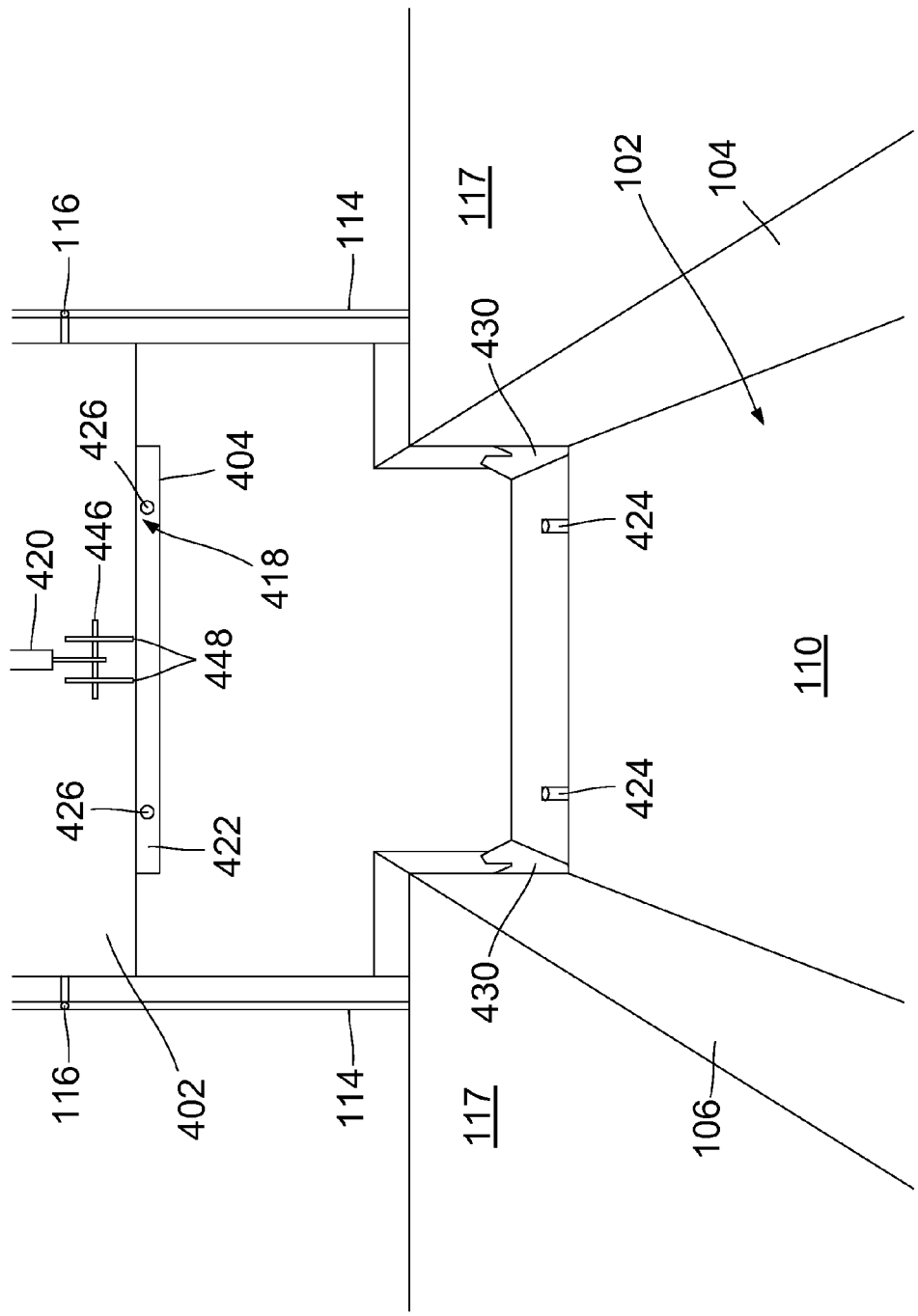
FIG. 26 is a rear view of the exemplary pit seal of FIG. 24, where the pit seal is pivoted with respect to the overhead door when the overhead door is in its open position.

Referring to FIGS. 24-26, a further exemplary repositionable pit seal 400, in contrast to the foregoing exemplary embodiments, is repositionably mounted to the bottom of a conventional overhead door 402. In this exemplary embodiment, the repositionable pit seal 400 comprises a pit seal panel 404 that is pivotally mounted to the bottom panel of an overhead door 402 via a pair of hinges 406.

As shown in FIG. 25, the construction of the pit seal panel 404 is similar to the pit seal panel 123 of the foregoing exemplary embodiments. Specifically, the pit seal panel 404 may be fabricated from an extruded polymer or metal and includes a generally planar front face sheet 408 and rear face sheet 410. The front face sheet 408 is adapted to face outward, away from interior of the building housing the pit 102, while the rear face sheet 410 is adapted to face the interior of the building. The face sheets 408, 410 are interposed by a series of walls 412 that extend longitudinally along the length of the panel 404. As can be seen from FIG. 25, these walls 412 are angled at various degrees to provide structural support to the face sheets 408, 410. Together, the walls 412, and face sheets 408, 410 define a series of longitudinal cavities 414 extending through the panel 404. Depending upon the end application, such as in a refrigerated building, the cavities may include an insulating material such as, without limitation, latex or acrylic foam.

The top 416 and bottom 418 of the panel 404 are substantially flat and have mounted thereto a weather-strip retainer 420 having a pair of inverted T-shaped cavities. These inverted T-shaped cavities are adapted to receive the corresponding T-shaped ends of weather-stripping 422 to secure the weather-stripping to the weather-strip retainer 420. At least one opening (not shown) is formed through the bottom 418 of the panel 404, the weather-stripping retainer 420, and the weather-stripping 422 in order to accommodate throughput of at least one retainer pin 424.

In this exemplary embodiment, two retainer pins 424 are mounted within corresponding openings in the floor 110 of the pit 102. The retainer pins 424 operate to inhibit lateral movement of the lower portion of the panel 404 when the pins 424 are secured within the openings 426 in the panel. In exemplary form, the panel 404 also includes weather-stripping retainers 420 and weather-stripping 422 along the lateral/longitudinal sides, thereby forming a weather-stripping perimeter around the panel.

Alternatively, or in addition to utilizing the retainer pins 424, the pit 102 may include a pair of tapered or U-shaped guides 430 to precisely guide the panel 404 into position as the panel is lowered into the pit 102 and into its barrier position. Each guide 430 is bolted to the floor 110 of the pit 102 and is positioned adjacent to the right and left side walls 104, 106. Accordingly, any attempt to dislodge or laterally remove the panel 404 from outside is inoperative because the guides 430 and pins 424 cooperate to retain the panel 404 laterally in position. With that said, the panel 404 may be not be repositioned vertically if the overhead door 402 is locked in its furthermost lowered position. Yet when the overhead door 402 is raised, so too is the panel 404 raised. However, in order to maintain the vertical clearance of the original overhead door 402, the panel 404 is selectively repositionable.

The exemplary repositionable pit seal 400 includes a pneumatic cylinder or linear actuator 440 concurrently mounted to the overhead door 402 and the pit seal panel 404. A pair of angle brackets 442 are vertically oriented and mounted to the overhead door 402 in a spaced apart fashion. Each of the angle brackets includes a plurality of through holes that are adapted to receive a rod 444 to secure the cylinder end of the pneumatic cylinder 440. The opposite end of the pneumatic cylinder 440 is mounted to the panel 404 using a rod 446 and a pair of angle brackets 448. The angle brackets 448 mounted to the panel 404 are vertically oriented and spaced apart to accommodate the piston of the pneumatic cylinder 440. Again, similar to the brackets 442 mounted to the overhead door, the brackets 448 mounted to the panel 404 include a series of vertically distributed through holes to accommodate different throughput locations of the rod 446.

In operation, the repositionable pit seal 400 may be repositioned between a barrier position (see FIG. 24) and an egress position (see FIG. 26). By way of exemplary explanation, repositioning the pit seal 400 from its barrier position to its egress position includes unlocking the overhead door 402 from the adjacent C-track 114. Presuming the overhead door 402, and the rollers 116 mounted thereto, are able to be repositioned with respect to the C-track, the overhead door may be raised using a conventional overhead door lift system (not shown). As the overhead door 402 is raised, so too is the pit seal 400. As the pit seal panel 404 is vertically raised, the lateral ends to the panel initially follow the track of the guides 430 and allow the panel to be raised vertically over the pins 424. As soon as the panel 424 clears the pins 424 and guides 430, the pneumatic cylinder or linear actuator 440 may be engaged to pivot the panel with respect to the overhead door 402.

By way of example, the pneumatic cylinder or linear actuator 440 allows the panel 424 to be pivoted anywhere between 0-135 degrees (either inward or outward) with respect to the overhead door. As shown in FIG. 26, the panel 424 is pivoted outward approximately 90 degrees from the bottom section of the overhead door 402. In this position, the clearance otherwise obtainable by the overhead door 402 prior to attaching the panel is nearly the same as that achieved when the panel is pivoted 90 degrees with respect to the overhead door. However, those skilled in the art will understand that pneumatic cylinder or linear actuator 440 is optional as it may not be necessary to pivot the panel with respect to the door such as circumstances where clearance is not an issue. In exemplary form, the pneumatic cylinder or linear actuator 440 includes an electronic controller (not shown) and other appropriate sensors and electronics as will be known to those skilled in the art and programmed to reposition the panel 404 as the overhead door 402 is repositioned.

Repositioning the pit seal 400 to its barrier position includes a similar sequence of events performed in reverse order. For example, as the overhead door 402 is initially lowered from its overhead storage position, the panel 404 is pivoted to be vertically aligned with the overhead door, the guides 430, and the pins 424. After the panel 404 is vertically aligned with the door 402, the door may be further lowered so that the bottom of the door reaches the floor 117 of the building. As the overhead door 402 reaches the floor 117 of the building, the lower portion of the panel 404 is positioned adjacent to the floor 110 of the pit 102. Thus, the combination of the panel 404 and overhead door 402 is operative to close off the entire loading dock opening.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of selectively closing off a loading dock opening defined by a loading dock pit recessed within a floor of a building and a doorway into the building, the method comprising:
   repositioning a pit seal panel having a substantially incompressible height and width to a barrier position where the pit seal panel closes off a rectangular area substantially spanning an entire vertical dimension and an entire widthwise dimension of the loading dock pit; and
   lowering an overhead door to concurrently contact the pit seal panel and the floor of the building to close off the loading dock opening.

2. The method of claim 1, further comprising:
   repositioning a vertically stored dock leveler from a horizontal use position to a vertical storage position after raising the overhead door, the vertically stored dock leveler at least partially located within the loading dock pit, wherein repositioning the vertically stored clock leveler from the horizontal use position to the vertical storage position coincides with repositioning the pit seal panel to the barrier position.

3. The method of claim 2, wherein a mechanical linkage is concurrently mounted to the vertical stored dock leveler and the pit seal panel so that repositioning the vertically stored dock leveler to from the horizontal use position to the vertical storage position is operative to reposition the pit seal panel to the barrier position.

4. The method of claim 2, wherein:
the act of repositioning the pit seal panel includes controlling the repositioning of the pit seal panel with an electronic controller that receives information regarding the position of the vertically stored dock leveler.

5. The method of claim 1, wherein:
the pit seal panel is mounted to an interior wall partially defining the loading dock pit; and
the act of repositioning the pit seal panel to the barrier position includes pivoting the pit seal panel with respect to the interior wall of the loading dock pit.

6. The method of claim 1, wherein:
the pit seal panel is mounted to the overhead door; and
the act of repositioning the pit seal panel to the barrier position includes repositioning the pit seal panel with respect to the overhead door and lowering the pit seal panel into the loading dock pit.

7. The method of claim 6, wherein:
the pit seal panel is pivotally mounted to the overhead door; and
an actuator is concurrently mounted to the pit seal panel and the overhead door to reposition the pit seal panel to the barrier position.

8. The method of claim 1, wherein:
a top of the pit seal panel engages a bottom of the overhead door when the bottom of the overhead door contacts the top of the pit seal panel to lock the pit seal panel to the overhead door.

9. The method of claim 1, further comprising:
repositioning the pit seal panel from the barrier position to a storage position; and
raising an overhead door to discontinue contact with the floor of the building, where raising the overhead door and repositioning the pit seal panel to the storage position is operative to no longer close off the loading dock opening.

10. The method of claim 1, wherein:
lowering the overhead door to concurrently contact the pit seal panel and the floor of the building is operative to lock the pit seal panel in the barrier position.

11. A method of repositioning a rigid wall to selectively blockade a forward area of a loading dock pit formed into the floor of a building and partially defined by opposing vertical side walls, a rear vertical wall, and a bottom horizontal surface, the loading dock pit including a rear area, opposite the forward aspect, at least partially occupied by a vertically stored dock leveler, the method comprising:
positioning a rigid wall to a blocking position within the forward aspect of the loading dock pit, the blocking position having the rigid wall horizontally spanning between the opposing vertical side walls and concurrently vertically spanning between the bottom horizontal surface and a horizontal plane of the floor of the building; and
positioning an overhead door to concurrently contact the rigid wall and the floor of the building to lock the rigid wall in the blocking position.

12. The method of claim 11, further comprising:
repositioning the rigid wall from the blocking position to a storage position so the rigid wall does not concurrently horizontally span between the opposing vertical side walls and vertically span between the bottom horizontal surface and the horizontal plane of the floor of the building;
repositioning the overhead door to no longer concurrently contact the rigid wall and the floor of the building; and
positioning the vertically stored dock leveler from a vertical storage position to a horizontal use position so that a decking of the vertically stored dock leveler is generally parallel to the floor of the building, where the vertical storage position is not reached prior to repositioning the rigid wall from the blocking position.

13. The method of claim 11, further comprising:
positioning the vertically stored dock leveler to a vertical storage position so that a decking of the vertically stored dock leveler is generally perpendicular to the floor of the building, wherein a mechanical linkage is concurrently mounted to the vertical stored dock leveler and the rigid wall so that positioning the vertically stored dock leveler to the vertical storage position is operative to position the rigid wall to the blocking position.

14. The method of claim 12, wherein:
the act of repositioning the rigid wall from the blocking position to the storage position includes controlling the repositioning of the rigid wall with an electronic controller that receives information regarding the position of the vertically stored dock leveler.

15. The method of claim 1, wherein:
the rigid wall is mounted to at least one of the opposing vertical side walls and the bottom horizontal surface partially defining the loading dock pit; and
the act of positioning the rigid wall to the blocking position includes pivoting the rigid wall with respect to at least one of the opposing vertical side walls and the bottom horizontal surface of the loading dock pit.

16. The method of claim 15, further comprising:
positioning the vertically stored dock leveler from a vertical storage position to a horizontal use position so that a decking of the vertically stored dock leveler is generally parallel to the floor of the building;
the act of pivoting the rigid wall with respect to at least one of the opposing vertical side walls of the loading dock pit includes pivoting the rigid wall to be beneath the vertically stored dock leveler when the vertically stored dock leveler is in the horizontal use position.

17. The method of claim 11, further comprising:
repositioning the rigid wall from the blocking position to a storage position by lifting the rigid wall out of the loading dock pit, wherein the rigid wall is removably mounted to at least one of the opposing vertical side walls and the bottom horizontal surface partially defining the loading dock pit.

18. The method of claim 11, wherein:
the rigid wall is mounted to the overhead door; and the act of positioning the rigid wall to the blocking position includes positioning the rigid wall with respect to the overhead door and lowering the rigid wall into the forward aspect of the loading dock pit.

19. The method of claim 1, wherein:

a top of the pit seal panel locks into a bottom of the overhead door when the bottom of the overhead door contacts the top of the pit seal panel.

20. The method of claim 11, further comprising:

repositioning the vertically stored dock leveler from a vertical storage position to a horizontal use position;

repositioning the rigid wall from a blocking position to a storage position beneath the horizontal use position of the vertically stored dock leveler;

wherein the rigid wall is biased to the blocking position; and wherein the act of repositioning the vertically stored dock leveler from a vertical storage position to a horizontal use position includes the vertically stored dock leveler contacting a roller mounted to rigid wall to overcome the bias of the rigid wall and reposition the rigid wall to the storage position.

* * * * *